United States Patent
Zhu et al.

(10) Patent No.: US 11,677,159 B2
(45) Date of Patent: Jun. 13, 2023

(54) ELECTRONIC APPARATUS AND IMAGING METHOD

(71) Applicant: KABUSHIKI KAISHA TOSHIBA, Tokyo (JP)

(72) Inventors: Xu Zhu, Kawasaki Kanagawa (JP); Hiroki Mori, Kawasaki Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 632 days.

(21) Appl. No.: 16/555,381

(22) Filed: Aug. 29, 2019

(65) Prior Publication Data
US 2020/0161775 A1 May 21, 2020

(30) Foreign Application Priority Data
Nov. 15, 2018 (JP) .............................. JP2018-214769

(51) Int. Cl.
H01Q 21/06 (2006.01)
G01S 13/44 (2006.01)
H01Q 19/06 (2006.01)

(52) U.S. Cl.
CPC ....... *H01Q 21/065* (2013.01); *G01S 13/4454* (2013.01); *H01Q 19/06* (2013.01)

(58) Field of Classification Search
CPC ... H01Q 21/065; H01Q 19/06; G01S 13/4454
See application file for complete search history.

(56) References Cited

U.S. PATENT DOCUMENTS

| 7,265,709 B2 * | 9/2007 | Fleisher | G01S 13/887 342/179 |
|---|---|---|---|
| 7,746,266 B2 * | 6/2010 | Zoughi | G01S 13/89 342/179 |
| 2014/0028457 A1 * | 1/2014 | Reinpoldt | G06V 20/52 340/552 |
| 2018/0088224 A1 * | 3/2018 | Kishigami | H01Q 21/06 |
| 2020/0355788 A1 * | 11/2020 | Kitamura | G01S 13/34 |

FOREIGN PATENT DOCUMENTS

| CN | 103616667 A | 3/2014 | |
|---|---|---|---|
| CN | 106785486 A | 5/2017 | |
| WO | WO-2015182002 A1 * | 12/2015 | ............. H01Q 21/06 |

OTHER PUBLICATIONS

Gerardo Di Martino et al., "Coprime Synthetic Aperture Radar (CopSAR): A New Acquisition Mode for Maritime Surveillance," IEEE Transactions on Geoscience and Remote Sensing, vol. 53, No. 6, Jun. 2015, pp. 3110-3123.

* cited by examiner

*Primary Examiner* — Peter M Bythrow
*Assistant Examiner* — Nazra Nur Waheed
(74) *Attorney, Agent, or Firm* — Holtz, Holtz & Volek PC

(57) ABSTRACT

According to one embodiment, an electronic apparatus comprises antenna elements and processor circuitry. The antenna elements are arranged respectively at least at first, second, third, and fourth positions. The first and second positions are arranged in a first direction. Spacing between the first positions and spacing between the second positions are coprime. The third and fourth positions are arranged in a second direction. Spacing between the third positions and spacing between the fourth positions are coprime.

28 Claims, 15 Drawing Sheets

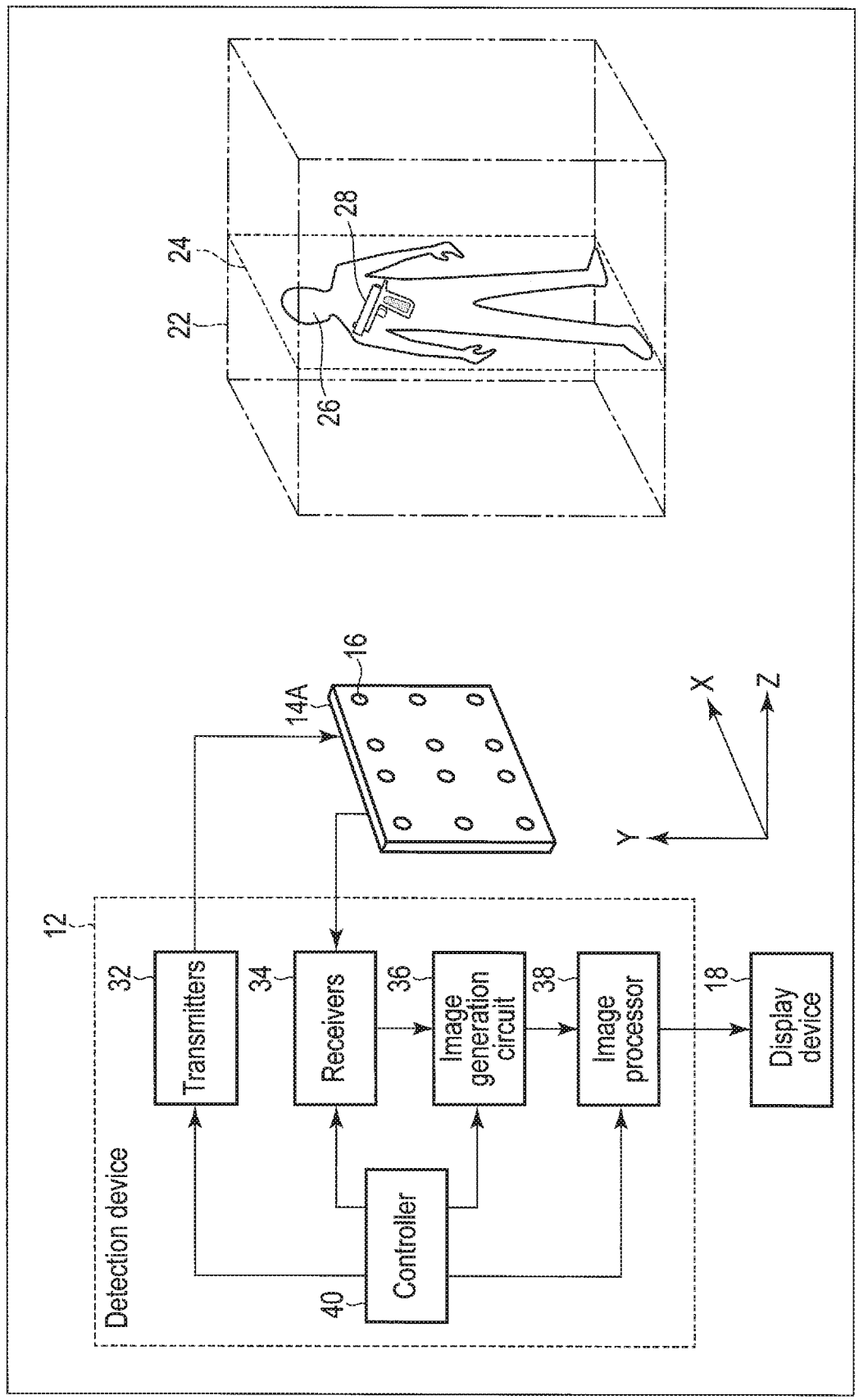
F I G. 1

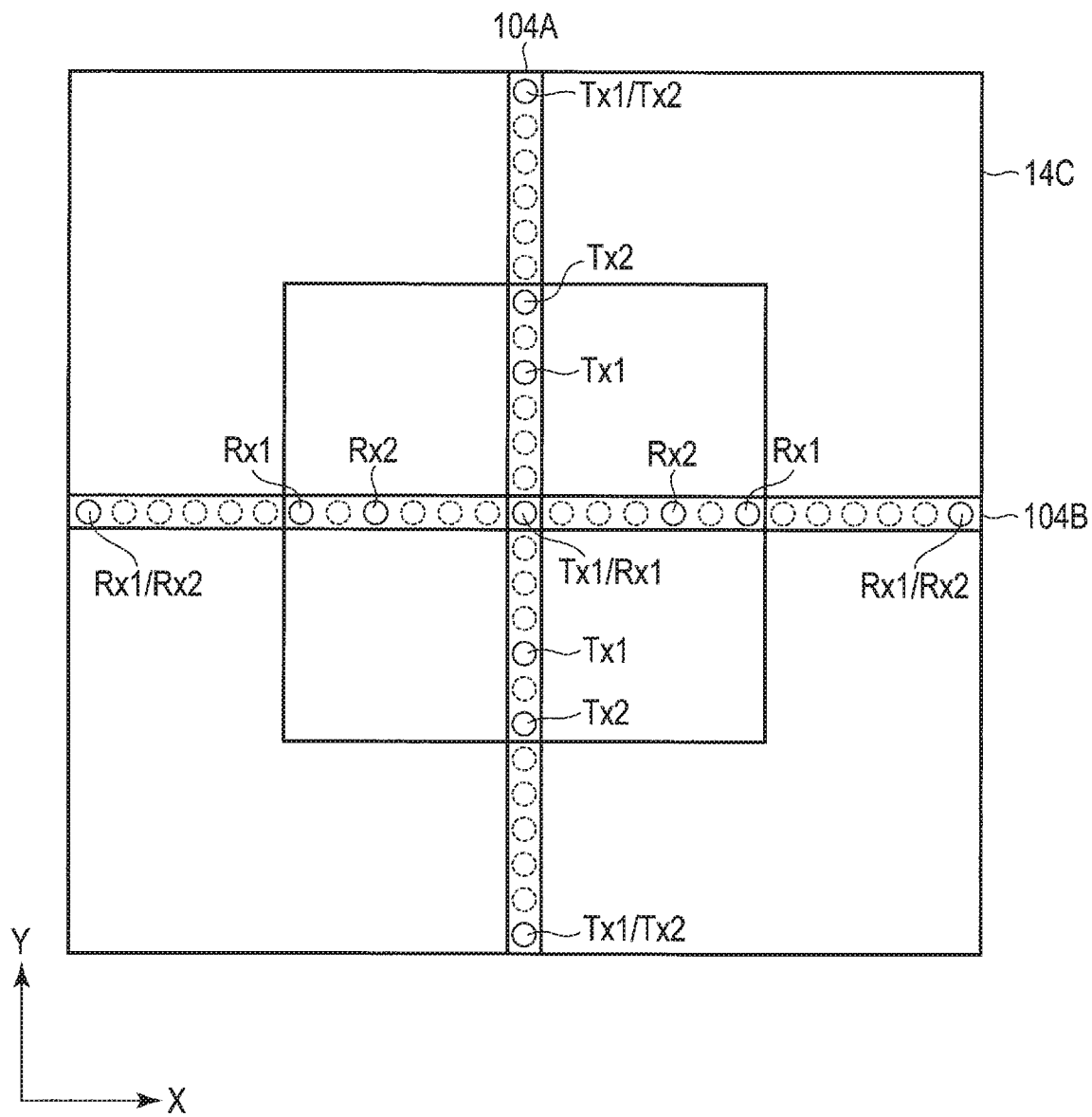
F I G. 11

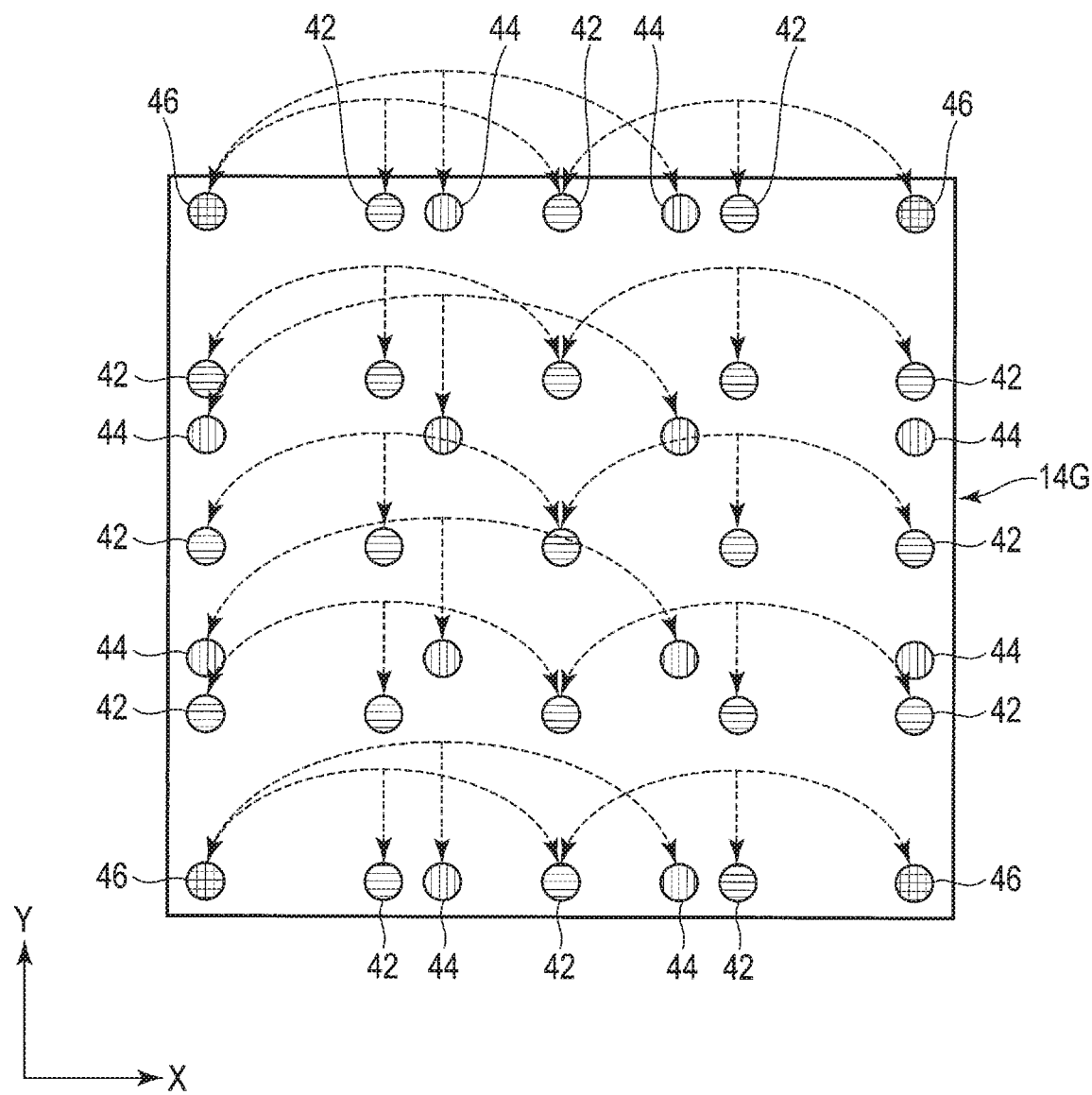
F I G. 16

ELECTRONIC APPARATUS AND IMAGING METHOD

CROSS-REFERENCE TO RELATED APPLICATIONS

This application is based upon and claims the benefit of priority from Japanese Patent Application No. 2018-214769, filed Nov. 15, 2018, the entire contents of which are incorporated herein by reference.

FIELD

Embodiments described herein relate generally to an electronic apparatus that generates an image of an object and an imaging method of the electronic apparatus.

BACKGROUND

There are electronic apparatuses that observe an object using an electromagnetic wave such as an extra high frequency wave. The apparatuses include an array antenna including a plurality of antenna elements to reconstruct an image of the object. In the array antenna, the antenna elements are separated by half of a wavelength. When the extremely high frequency is used, the internal between the antenna elements will be a few millimeters (for example, equal to, or less than two millimeters) and the quality of the image may be deteriorated by interference between adjacent antenna elements. The influence of the interference is especially a problem when data transference is performed through a multiple input multiple output (MIMO) method. When the extra high frequency is used, spacing between adjacent antenna elements is narrow, and thus, a great number of antenna elements are required. A transmission/reception time becomes longer and the data amount of reception signals increases. Therefore, a calculation time becomes longer.

BRIEF DESCRIPTION OF THE DRAWINGS

FIG. 1 illustrates an example of the structure of an electronic apparatus according to a first embodiment.

FIG. 11 illustrates an example of an array antenna 14C according to a third embodiment.

FIG. 16 illustrates an example of the state where the number of the antenna elements is reduced because of a replacement of a part of the array antenna 14A with the array antenna 14G.

DETAILED DESCRIPTION

Figure 2:
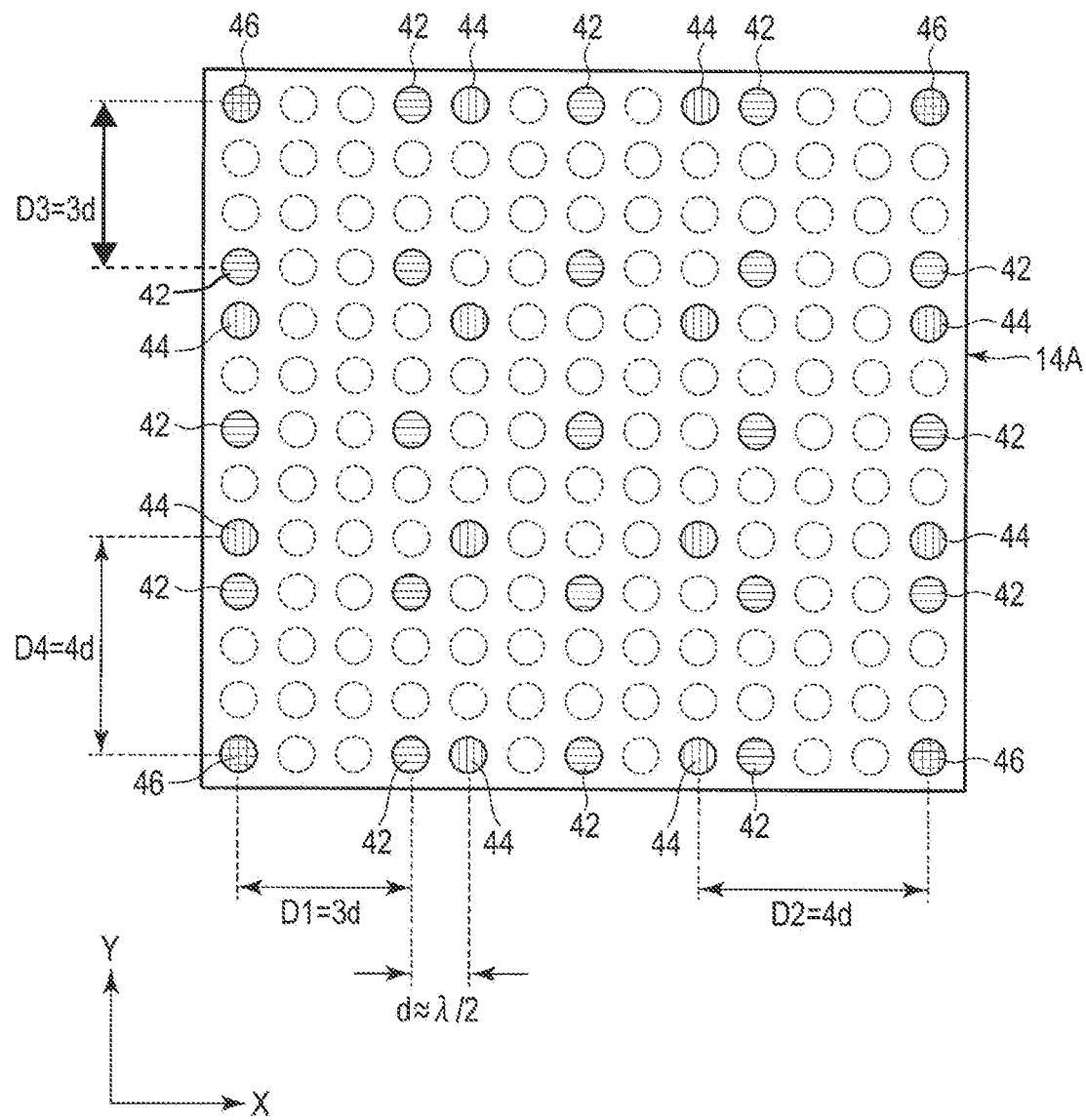
FIG. 2 illustrates an example of an array antenna 14A according to the first embodiment.

Embodiments will be described hereinafter with reference to the accompanying drawings. In the following description, apparatuses and methods to realize technical concepts of embodiments are exemplified and the technical concepts of the embodiments are not limited by structures, shapes, arrangements, and materials of the following structural elements. Changes which would easily been conceived by a person having ordinary skill in the art may be encompassed by the scope of invention. For further clarification, in the figures, dimensions of each element may be changed from the actual embodiments and schematically illustrated. The same elements may be illustrated with different dimensions and different proportions between some figures. In some figures, corresponding elements may be referred to by the same reference numbers and explanation considered redundant will be omitted. Some elements may be referred to by different terms but the terms are merely examples, and the elements may be referred to by other terms. Furthermore, elements that are not referred to by multiple terms may be referred to by other terms. Note that, in the following description, a term "connection" includes not only a direct connection between elements but also indirect connection between elements with a different element interposed therebetween.

In general, according to one embodiment, an electronic apparatus comprises antenna elements arranged in a two-dimensional area, and processor circuitry configured to acquire a signal obtained by both transmitting an electromagnetic wave from any of the antenna elements and receiving, by any of the antenna elements, the electromagnetic wave reflected by an object. The antenna elements are arranged respectively at least at first, second, third, and fourth positions. The first positions are arranged in a first direction in the two-dimensional area and separated by m times half of a wavelength of the magnetic wave wherein m is a positive integer more than one. The second positions are arranged in the first direction in the two-dimensional area and separated by n times half of the wavelength wherein n is a positive integer more than one and m and n are coprime. The third positions are arranged in a second direction different from the first direction in the two-dimensional area and separated by p times half of the wavelength wherein p is a positive integer more than one. The fourth positions are arranged in the second direction in the two-dimensional area and separated by q times half of the wavelength wherein q is a positive integer more than one and p and q are coprime.

First Embodiment

FIG. 1 illustrates an example of the structure of an electronic apparatus of a first embodiment. The electronic apparatus includes an array antenna 14A, detection device 12, and display device 18. The array antenna 14A is arranged to be opposed to an object (for example, a person) 26. The detection device 12 is connected to the array antenna 14A. The display device 18 is connected to the detection device 12. The array antenna 14A is a two-dimensional array antenna including a plurality of antenna elements 16 arranged two-dimensionally on a quadrilateral substrate (in this example, a square substrate, for example). The substrate is positioned in an X-Y plane. The size of the substrate corresponds to the size of the object 26. An electromagnetic wave is radiated from the antenna elements 16 in a direction Z that is orthogonal to the substrate. The electromagnetic wave transmitted from the array antenna 14A is, for example, an extra high frequency (EHF) wave.

The detection device 12 can obtain an image of the object 26 in a plane 24. The plane 24 is in a three-dimensional space 22 positioned in a transmission direction of the electromagnetic wave transmitted from the array antenna 14A and is parallel with the array antenna 14A. The position of the plane 24 corresponds to a period from the transmission of the electromagnetic wave to the reception thereof. The period from the transmission of the electromagnetic wave to the reception thereof is set to correspond to many positions of the planes 24 in the three-dimensional space 22 to obtain the image of the plane 24 in many different positions, and thus, a three-dimensional image of the object 26 can be obtained. If the array antenna 14A is a one-dimensional array antenna in which a plurality of antenna elements are arranged in a one-dimensional line (for example, a line in direction X), a three-dimensional image cannot be obtained, but a two-dimensional image of the object in an X-Z plane can be obtained. The X-Z plane extends in a radiation direction of the electromagnetic wave and includes the one-dimensional array antenna. As an example of usage of the detection device 12 may be a body inspection of users of airports, stations, and the like.

Although this will be detailed with reference to FIG. 2, the array antenna 14A includes a first subarray antenna and a second subarray antenna that are arranged in a mixed manner on the substrate. The antenna elements 16 of the first subarray antenna are separated by the first spacing. The antenna elements 16 of the second subarray antenna are separated by the second spacing. Most of the antenna elements 16 are components of the first subarray antenna or the second subarray antenna while some of the antenna elements 16 are common components with the first and second subarray antennas.

Spacing between adjacent antenna elements of the ordinary array antenna is half of the wavelength (hereinafter, this array antenna may be referred to as a half-wave array antenna for convenience of the explanation). Spacing between adjacent antenna elements of the first subarray antenna is a positive integral multiple of half of the wavelength. Spacing between adjacent antenna elements of the second subarray antenna is a positive integral multiple of half of the wavelength. The positive integral multiple is two or more multiple, and thus, the array antenna 14A includes the first sparse subarray antenna and the second sparse subarray antenna. In the first sparse subarray antenna and second sparse subarray antenna, the antenna elements are arranged such that spacing between adjacent antenna elements are wider than half of the wavelength. Hereinafter, for convenience of the explanation, the first subarray antenna and the second subarray antenna may be referred to as coprime array antennas. Spacing between adjacent antenna elements (specifically, the number derived from dividing spacing between adjacent antenna elements by half of the wavelength) of the first subarray antenna and spacing between adjacent antenna elements of the second subarray antenna are coprime (i.e., their greatest common divider is 1).

The detection device 12 includes transmitters 32 and receivers 34. The transmitters 32 and receivers 34 are connected to the antenna elements 16. The number of the transmitters 32 and the number of the receivers 34 may be equal to the number of the antenna elements 16 so that one transmitter 32 and one receiver 34 may be connected to one antenna element 16. Alternatively, the number of the transmitters 32 and the number of the receivers 34 may be less than the number of the antenna elements 16 so that one transmitter 32 and one receiver 34 may be connected to several antenna elements 16 through a selector.

Transmission/reception methods of the array antenna may be a mono-static method, or a bi-static method or a multi-static method. In the mono-static method, the transmission/reception is performed with the same antenna element. In the bi-static method or multi-static method, the transmission/reception is performed with different antenna elements. In the bi-static method, one antenna element transmits a signal and another antenna element receives the signal. In the multi-static method, one antenna element transmits a signal and other antenna elements receive the signal. According to the first embodiment, the mono-static method is adopted, and thus, each antenna element 16 is a transmitter/receiver antenna element. The transmitters 32 and receivers 34 are controlled by a controller 40. The controller 40 may include processor circuitry such as a CPU, a storage for storing a program that can be executed by the processor circuitry and data, a main memory for storing the program read from the processor circuitry and data.

The transmitters 32 and the receivers 34 are connected to the controller 40 via a wired or wireless manner. The controller 40 controls, for example, a transmission frequency, bandwidth, and transmission timing per subarray antenna and per antenna element 16 in the transmitters 32 side, and a reception timing (a period from the transmission to the reception) per subarray antenna and per antenna element 16 in the receivers 34 side. A reception signal of one antenna element 16 corresponds to an image signal of one pixel of the object 26. The controller 40 sequentially changes (i.e., scans) the antenna elements 16 per subarray antenna and change the reception timing. The electromagnetic wave transmitted from each of the antenna elements 16 is reflected by the object 26, and the reflected wave is received by a transmitting antenna element 16.

The reception signal output from the receivers 34 is supplied no an image generation circuit 36, and then, a first image signal indicative of a three-dimensional image of the object 26 and a second image signal indicative of a three-dimensional image of the object 26 are generated. The first image signal is formed based on the reception signal of the first subarray antenna and the second image signal is formed based on the transmission/reception by the second subarray antenna. An image reconstruction algorithm of the image generation circuit 36 may be a time domain method, or a frequency domain method, or any other optional algorithm.

The first image signal and the second image signal are supplied to the image processor 38. The image processor 38 combines the first image signal and second image signal, and generates a synthesized image signal. The image generation circuit 36 and the image processor 38 are controlled by the controller 40. The image generation circuit 36 and the image processor 38 are connected through a wired or wireless manner. The receivers 34 and the image generation circuit 36 are connected through a wired or wireless manner. The synthesized image signal supplied to a display device 18. The synthesized image is displayed by the display device 18. By observing the image, an operator can detect whether or not the object 26 has a dangerous item (for example, a weapon) 28. The image processor 38 and the display device 18 are connected through a wired or wireless manner.

FIG. 2 illustrates an example of the array antenna 14A. In the array antenna 14A, a virtual lattice of constant spacing d (here, half of the wavelength=$\lambda/2$) is set. The antenna elements 16 (antenna elements are denoted by reference numbers 42, 44, and 46 in FIG. 2) may be arranged at crossing points of the virtual lattice. However, in the array antenna 14A, the antenna elements 16 are not arranged at all crossing points of the virtual lattice as with the half wave array antenna. The antenna elements 16 of the array antenna 14A are not arranged at most of the crossing points of the virtual lattice (dotted-line circles of FIG. 2). The antenna elements 16 of the array antenna 14A include first antenna elements 42, second antenna elements 44, and third antenna elements 46. The antenna elements 42, 44, and 46 are arranged two-dimensionally in the direction X and Y and separated by a spacing. Spacing between adjacent antenna elements 42, 44, and 46 is a few times of spacing d of the virtual lattice with a partial exception. That is, in the array antenna 14A, the antenna elements 42, 44, and 46 are arranged more sparsely than the half-wave array antenna. The array antenna 14A is sparser than the half-wave array antenna, and interference of adjacent antenna elements does not occur in the array antenna.

Spacing D1 in the direction X between adjacent first antenna elements 42 is D1=m×d which is m times the half-wavelength d. Spacing D2 in the direction X between adjacent second antenna elements 44 is D2=n×d that is n times the half-wavelength d. Numbers of m and n are two coprime positive integers which are two or more, that is, for example, m=3 and n=4. The numbers of m and n are not limited thereto, and the numbers of m and n are optional.

Spacing D3 in the direction Y between adjacent first antenna elements 42 is D3=p×d which is p times the half-wavelength d. Spacing D4 in the direction Y between adjacent second antenna elements 44 is D4=q×d which is q times the half-wavelength d. Numbers of p and q are two coprime positive integers which are two or more, that is, for example, p=3 and q=4. The numbers of p and q are not limited thereto, and the numbers of p and q are optional. For example, m and p may be different, n and q may be different, and spacing between adjacent antenna elements may be different in the directions X and Y.

The third antenna elements 46 are arranged at the four corners of the virtual lattice of the array antenna 14A. The first antenna elements 42 and the third antenna elements 46 form the first subarray antenna in which spacing D1 between adjacent antenna elements is D1=3d. The second antenna elements 44 and the third antenna elements 46 form the second subarray antenna in which spacing D2 between adjacent antenna elements is D2=4d. That is, spacing between adjacent antenna elements of the first subarray antenna and spacing between adjacent antenna elements of the second subarray antenna are coprime. The first subarray antenna and the second subarray antenna are called coprime array antennas. The third antenna elements 46 are included in the first subarray antenna and in the second subarray antenna.

The resolution of the image generated using the two coprime array antennas is irrelevant to the spacing of the antenna elements, but is determined based on the apertures (sizes) of the array antennas and the beam patterns of the antenna elements. The size of the array antennas can be set freely, and may be set to the same as the cross-sectional area of the object 26, and thus, the array antennas can completely cover the object 26. The beam pattern is set such that the transmitter antenna elements in optional positions transmit an electromagnetic wave to the object 26 and the receiver antenna elements in optional positions receive the electromagnetic wave reflected by the object 26. Thus, the resolution of the image generated by the array antenna 14A of the first embodiment can conform to the resolution of the image by the half-wave array antenna. The number of the antenna elements of the array antenna 14A of the first embodiment is thirty-seven. In the half-wave array antenna, since the antenna elements are arranged at all crossing points of the virtual lattice, the number of antenna elements is one hundred and sixty-nine, and thus, in the first embodiment, the number of the antenna elements can be reduced. With fewer antenna elements, the transmission/reception time can be shortened, the data amount of the reception signal can be suppressed, and the calculating time can be cut.

The characteristics of the array antennas in which the antenna elements are separated by a spacing that is wider than half of the wavelength will be explained. When the number of antenna elements is given N, spacing between adjacent antenna elements is given D, a difference in phase excitation between antenna elements is given $\beta$, and direction of measurement points in the object is an angle $\theta$ with respect to the array antenna surface, the propagation phase difference of the electromagnetic wave transmitted from two antenna elements is $kD \cos \theta$ where k is a wavenumber.

The total phase shift $\psi$ is given by:

$$\psi = kD \cos \theta + \beta \qquad \text{Eq. 1}$$

In consideration of the round-trio effect of transmission and reception, the wavenumber k is defined as $4\pi/\lambda$. Thus, the normalized radiation pattern can be expressed as:

$$AF = (1/N)(\sin(N\psi/2)/\sin(\psi/2)) \qquad \text{Eq. 2}$$

Equation 2 is a general presentation of radiation pattern of array antenna. The maximum value of Equation 2 occurs when:

$$\psi = kD \cos \theta + \beta = \pm 2m\pi \qquad \text{Eq. 3}$$

Now, m=[0, 1, 2 . . . ]. In many applications, it is desirable to have the maximum radiation of an array directed normal to the axis of the array. To have the first maximum directed toward $\theta = \pi/2$, then:

$$\psi = kD \cos \theta + \beta|_{\theta=\pi/2} = \beta = 0 \qquad \text{Eq. 4}$$

Thus, in order to have the maximum of the array factor of a uniform linear array directed broadside to the axis of the array, it is necessary that all the elements have the same phase excitation. However, if $D=\lambda/2$ and $\beta=0$, then:

$$\psi = kD \cos \theta + \beta = 2\pi \cos \theta|_{\theta=0,\pi} = \pm 2\pi \qquad \text{Eq. 5}$$

This value of $\psi$ when substituted in Equation 5 makes the array factor attain its maximum value at $\theta=0, \pi$. It means that this array factor contains 3 maxima at $\theta=0, \pi/2, \pi$. The extra two maxima are referred to as grating lobes. In addition, if $D=2.5\lambda$ and $\beta=0$, one can see that maximum toward $\theta=0$ shifts toward the angular region $0<\theta<\pi/2$ while the maximum toward $\theta=\pi$ shifts toward $\pi/2<\theta<\pi$, and 2 additional grating lobes appear. If spacing D between adjacent antenna elements is enlarged to $D=5\lambda$, up to 10 grating lobes appear on both sides of the main lobe.

Therefore, for any spacing between adjacent antenna elements, $D=n\lambda/2$, $n=1, 2, 3, \ldots$, the total phase shift $\psi$ is given by:

$$\psi=kD\cos\theta+\beta=2\pi n\cos\theta \quad \text{Eq. 6}$$

$$2\pi n\cos\theta_m=2m\pi \quad \text{Eq. 7}$$

If there are $\theta_m$ (m=[0, 1, 2, ...]) meeting Equation 7, then $\theta_m$ is the set of angles that makes the array factor attain its maximum value, that is to say:

$$\theta_m=\cos^{-1}(m/n) \quad \text{Eq. 8}$$

In FIG. 2, spacing D1 between adjacent antenna elements of the first subarray antenna is m×d (m=3) and spacing D2 between adjacent antenna elements of the second subarray antenna is n×d (n=4), and therein, m and n are coprime. Thus, Equation 8 indicates that the array factors of two subarray antennas become the maximum value at the same angle, that is, the vertical direction of the array (direction Z).

Thus, positions of the grating lobes of the two subarray antennas are different. In the transmission/reception performed by the array antenna in which the antenna elements are separated by a spacing that is wider than half of the wavelength, phantoms occur in the positions of grating lobes. The phantoms occur in different positions by the transmission/reception performed by two subarray antennas in which spacing between adjacent antenna elements of a first subarray antenna and spacing between adjacent antenna elements of a second subarray antenna are coprime. Therefore, the influence of the phantoms can be removed by performing an imaging process of two images generated by the transmission/reception performed by the two subarray antennas.

As can be understood from the above, in the array antenna 14A including the first and second subarray antennas in which spacing between adjacent antenna elements of the first subarray antenna and spacing between adjacent antenna elements of the second subarray antenna are coprime, spacing between adjacent antenna elements in most cases are 3d or 4d while only spacing between part of adjacent antenna elements 42 and 44 is d $(=\lambda/2)$. Thus, interference between adjacent antenna elements does not occur. Since the antenna elements are sparsely arranged, antenna elements are fewer, the transmission/reception time can be shortened, the data amount of the reception signal can be suppressed, and the calculating time can be cut.

The number of the subarray antennas of the array antenna 14A is not limited to two, and the array antenna 14A may be formed with three or more subarray antennas. In that case, between any two subarray antennas, spacing between adjacent antenna elements of a first subarray antenna is D1=m× d, spacing between adjacent antenna elements of a second subarray antenna is D2=n×d, and m and n are coprime positive integers which are two or more.

Figure 3A:
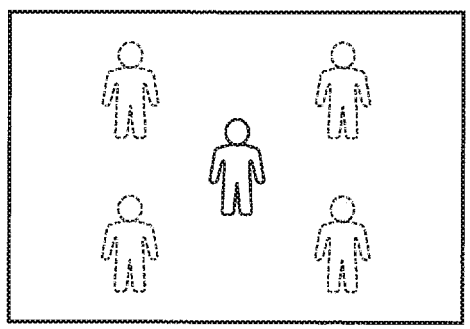
FIGS. 3A and 3B illustrate examples of a first image and a second image formed by a first subarray antenna and a second subarray antenna, respectively, of the array antenna 14A.
Figure 3B:
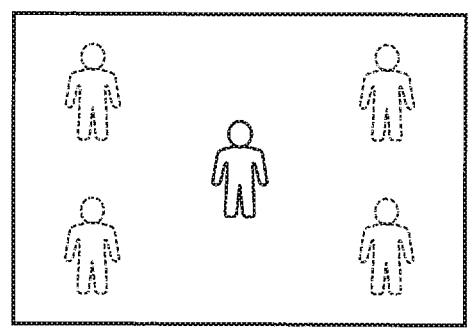
Figure 4:
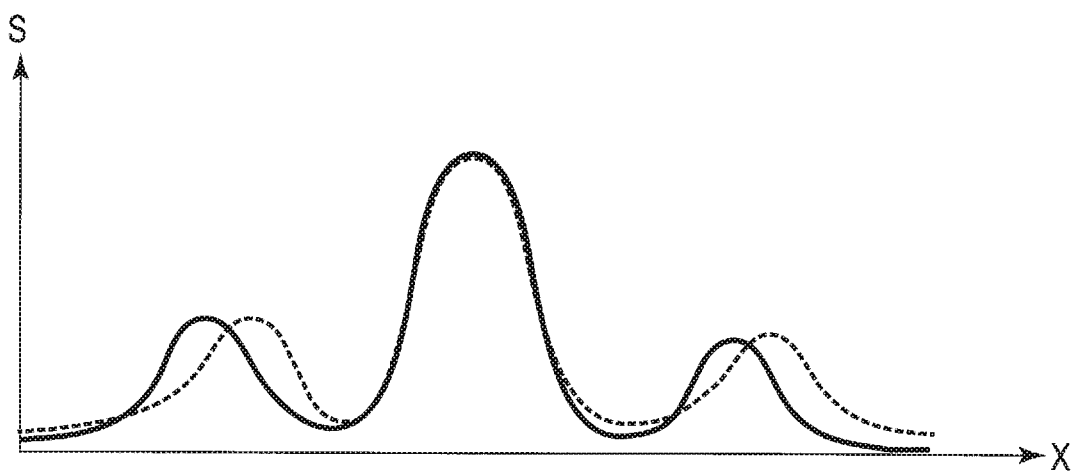
FIG. 4 illustrates an example of profiles of the first and second images of FIGS. 3A and 3B.
Figure 5:
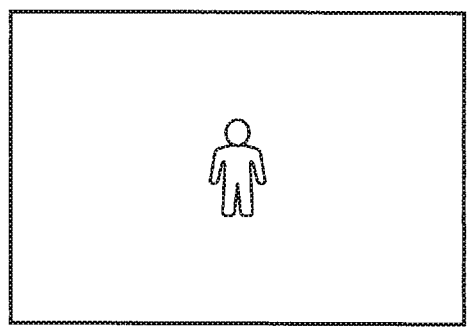
FIG. 5 illustrates an example of an image of an object obtained in the first embodiment.

Examples of the image of the object obtained it the first embodiment will be described with reference to FIGS. 3A, 3B, 4, and 5. FIG. 3A illustrates an example of a first image generated by the transmission/reception of an electromagnetic wave using the first subarray antenna, and FIG. 3B illustrates an example of a second image generated by the transmission/reception of an electromagnetic wave using the second subarray antenna. FIG. 4 illustrates a profile (solid line) of an image signal (a first image signal) S in direction of axis X indicating the first image of FIG. 3A and a profile (broken line) of an image signal (a second image signal) S in direction of axis X indicating the second image of FIG. 3B. As shown in FIGS. 3A and 3B, the first and second images formed by the first and second subarray antennas in which spacing between adjacent antenna elements is wider than half of the wavelength include the image of the object in the center part thereof and the phantoms of the object in the peripheral part thereof. In the first and second images, the positions of the phantoms are different. Thus, in each pixel, one with lesser absolute value is selected between the first image signal and be second image signal, and the first and second images are combined (synthesized), the synthesized image that is not influenced by the phantoms can be obtained as shown in FIG. 5.

Figure 6:
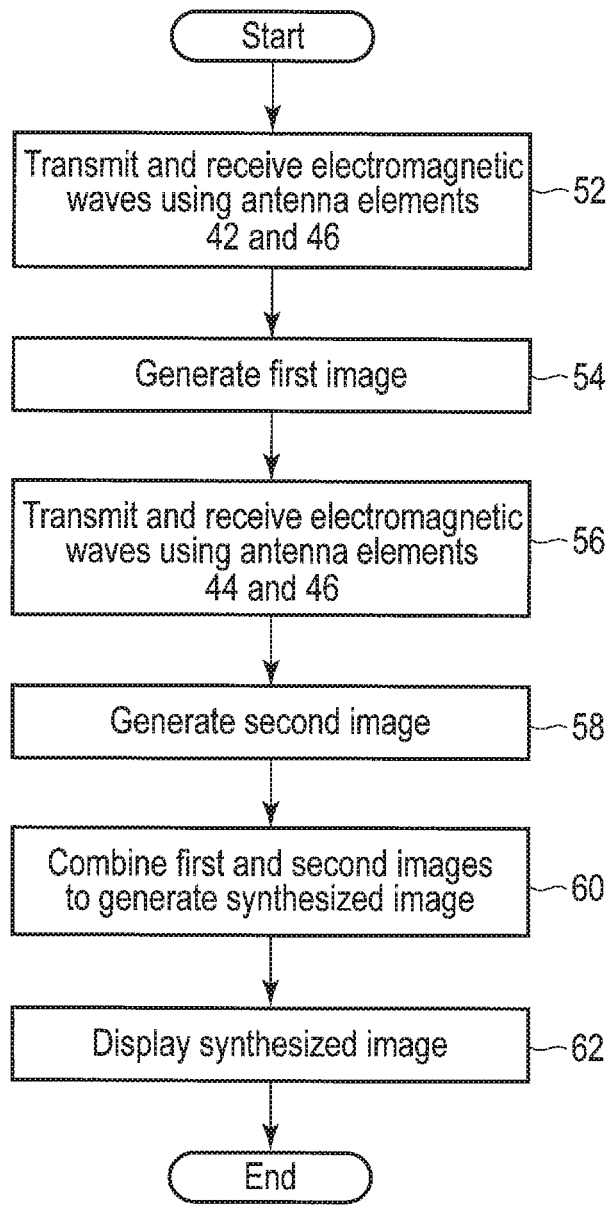
FIG. 6 is a flowchart of an example of an imaging method according to the first embodiment.

FIG. 6 is a flowchart of an example of an imaging method of the electronic apparatus of the first embodiment. The controller 40 transmits/receives an electromagnetic wave using a first subarray antenna including first antenna elements 42 and third antenna elements 46 in block 52.

The controller 40 may sequentially transmit an electromagnetic waveform each of the antenna elements 42 and 46 and sequentially receive the electromagnetic wave by each of the antenna elements 42 and 46. Alternatively, the controller 40 may transmit an electromagnetic wave from all antenna elements 42 and 46 of the second subarray antenna at the same time and sequentially receive the electromagnetic wave by each of the antenna elements 42 and 46.

The image generation circuit 36 generates a first image in block 54 based on the signals received by the antenna elements 42 and 46.

The controller 40 performs the transmission/reception of an electromagnetic wave using the second subarray antenna including the second antenna elements 44 and the third antenna elements 46 in block 56. The controller 40 may sequentially transmit an electromagnetic wave from each of the antenna elements 44 and 46 and sequentially receive the electromagnetic wave by each of the antenna elements 44 and 46. Alternatively, the controller 40 may transmit an electromagnetic wave from all antenna elements 44 and 46 of the second subarray antenna at the same time and sequentially receive the electromagnetic wave by each of the antenna elements 44 and 46. The image generation circuit 36 generates a second image in block 58 based on the signal received by the antenna elements 44 and 46.

The image processor 38 selects one with lesser absolute value between the first image signal and the second image signal in each pixel to combine the first image and the second image and generates a synthesized image without influence of phantoms in block 60. The display device 18 displays the synthesized image in block 62.

According to the first embodiment, the first and second images are generated by the first and second subarray antennas, respectively. Spacing between adjacent antenna elements of the first subarray antenna and spacing between adjacent antenna elements of the second subarray antenna are coprime. The first and second images are combined to select the minimum values thereof to obtain an image of an object without a phantom. Since an electromagnetic wave is transmitted/received by the first and second subarray antennas, interference between adjacent antenna elements does not occur, and the number of antenna elements is reduced. Thus, the transmission/reception time can be shortened, the data amount of the reception signal can be suppressed, and the calculating time can be cut. Furthermore, since the two-dimensional array antenna 14A is used, a three-dimensional image of the object can be obtained.

Second Embodiment

According to the first embodiment using the mono-static method, the number of the antenna elements is thirty-seven, and it is greatly reduced as compared to one hundred sixty-nine antenna elements in the half-wave array antenna. In the following embodiments, the number of antenna element is further reduced.

Figure 7:
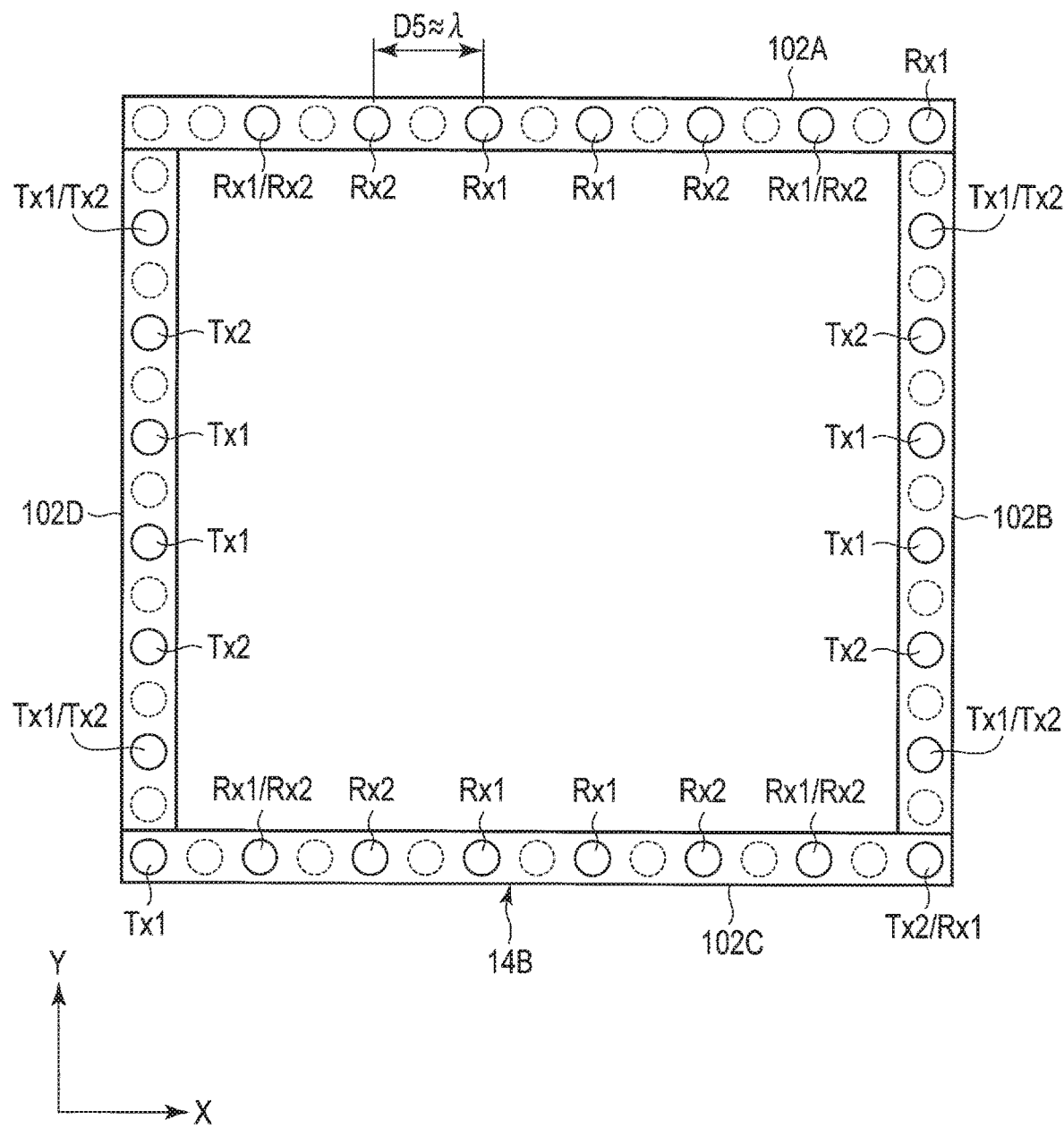
FIG. 7 illustrates an example of an array antenna 14B according to a second embodiment.

FIG. 7 illustrates an example of an array antenna 14B of an electronic apparatus. Since the detection device 12 and the display device 18 of the second embodiment are the same as those of the first embodiment, and thus, the description is omitted. According to the first embodiment, the mono-static method is used, and according to the second embodiment, the bi-static method is used. Alternatively, the multi-static method may be used instead of the bi-static method. The array antenna 14B of the second embodiment includes, for example, twenty-seven antenna elements that are less than thirty-seven antenna elements of the first embodiment. One of twenty-seven antenna elements is a transmitter/receiver antenna elements is a transmission antenna element or reception antenna element.

In the bi-static method, one transmitter antenna element transmits an electromagnetic wave and another receiver antenna element receives the reflection wave from the object to acquire a reception signal obtained from any of the antenna elements 42, 44, and 46 of the array antenna 14A of the first embodiment. That is, a pair of one transmitter antenna element and one receiver antenna element of the second embodiment works similarly to any one of the antenna elements 42, 44, and 46 of the first embodiment. In other words, a pair of one transmitter antenna element and one receiver antenna element of the second embodiment replaces any one of the antenna elements 42, 44, and 46 of the first embodiment, and as a result, the number of antenna elements can be reduced of the second embodiment.

Through a simple replacement, the number of antenna elements cannot be reduced. However, according to the second embodiment, because pairs of one transmitter antenna element and several receiver antenna elements are set, or of pairs of several transmitter antenna elements and one receiver antenna element are set, the number of antenna elements of the array antenna can further be reduced to twenty-seven from thirty-seven. The array antenna 14B including twenty-seven antenna elements can achieve the same function as with the array antenna 14A of the first embodiment, which includes first and second coprime subarray antennas including thirty-seven antenna elements.

The array antenna 14B of the second embodiment is formed on a substrate that is slightly larger than the array antenna 14A of the first embodiment. In FIG. 7, a square area having a blank inside corresponds to the array antenna 14A. The array antenna 14B includes four linear antenna parts 102A, 1022, 102C, and 102D arranged in a frame at four outer peripheries of the square area corresponding to the array antenna 14A. The virtual lattice of half of the wavelength of the array antenna 14A is set in the area of the array antenna 14B, and antenna elements are arranged at every other crossing point of the virtual lattice. Therefore, spacing D5 between any adjacent antenna elements is the wavelength λ.

An antenna part 102A arranged in the upper side of the area corresponding to the array antenna 14A and extending in direction X includes seven antenna elements in which spacing between adjacent antenna elements is D5. Three antenna elements Rx1 of the seven antenna elements are receiver antenna elements corresponding to the antenna elements 42 of the first subarray antenna of the first embodiment. Two antenna elements Rx2 of the seven antenna elements are receiver antenna elements corresponding to the antenna elements 44 of the second subarray antenna of the first embodiment. Two antenna elements Rx1/Rx2 or the seven antenna elements are receiver antenna elements corresponding to both the antenna elements 42 and 44 of the first and second subarray antennas of the first embodiment.

An antenna part 102C arranged in the lower side of the area corresponding to the array antenna 14A and extending in direction X includes eight antenna elements in which spacing between adjacent antenna elements is D5. Two antenna elements Rx1 of the eight antenna elements are receiver antenna elements corresponding to the antenna elements 42 of the first subarray antenna of the first embodiment. Two antenna elements Rx2 of the eight antenna elements are receiver antenna elements corresponding to the antenna elements 44 of the second subarray antenna of the first embodiment. Two antenna elements Rx1/Rx2 of the eight antenna elements are receiver antenna elements corresponding to both the antenna elements 42 and 44 of the first and second subarray antennas of the first embodiment. One antenna element Tx1 of the eight antenna elements is a transmitter antenna element corresponding to the antenna element 42 of the first subarray antenna of the first embodiment. One antenna element Tx2/Rx1 is a transmitter/receiver antenna element corresponding to both the antenna elements 42 and 44 of the first and second subarray antennas of the first embodiment.

An antenna part 102B arranged in the right side of the area corresponding to the array antenna 14A and extending in direction Y includes six antenna elements in which spacing between adjacent antenna elements is D5. Two antenna elements Tx1 of the six antenna elements are transmitter antenna elements corresponding to the antenna elements 42 of the first subarray antenna of the first embodiment. Two antenna elements Tx2 of the six antenna elements are transmitter antenna elements corresponding to the antenna elements 44 of the second subarray antenna of the first embodiment. Two antenna elements Tx1/Tx2 of the six antenna elements are transmitter antenna elements corresponding to both the antenna elements 42 and 44 of the first and second subarray antennas of the first embodiment.

An antenna part 102D arranged in the left side of the area corresponding to the array antenna 14A and extending in direction Y includes six antenna elements in which spacing between adjacent antenna elements is D5. Two antenna elements Tx1 of the six antenna elements are transmitter antenna elements corresponding to the antenna elements 42 of the first subarray antenna of the first embodiment. Two antenna elements Tx2 of the six antenna elements are transmitter antenna elements corresponding to the antenna elements 44 of the second subarray antenna of the first embodiment. Two antenna elements Tx1/Tx2 of the six antenna elements are transmitter antenna elements corresponding to both the antenna elements 42 and 44 of the first and second subarray antennas of the first embodiment.

If spacing between adjacent antenna elements in the directions X and Y are different in the array antenna 14A of the first embodiment, spacing between adjacent antenna elements of the antenna parts 102A and 102C along the direction X and spacing between adjacent antenna elements of the antenna parts 102B and 102D along the direction Y are different in the second embodiment.

According to the first embodiment, the transmitters 32 and receivers 34 are connected to each of the antenna elements 42, 44, and 46. However, according to the second embodiment, the receivers 34 are not connected to the transmitter antenna elements Tx1 and Tx2 while the transmitters 32 are not connected to the receiver antenna elements Rx1 and Rx2. Other structures than the detection device 12 of FIG. 1 are the same in the second embodiment.

Figure 8:
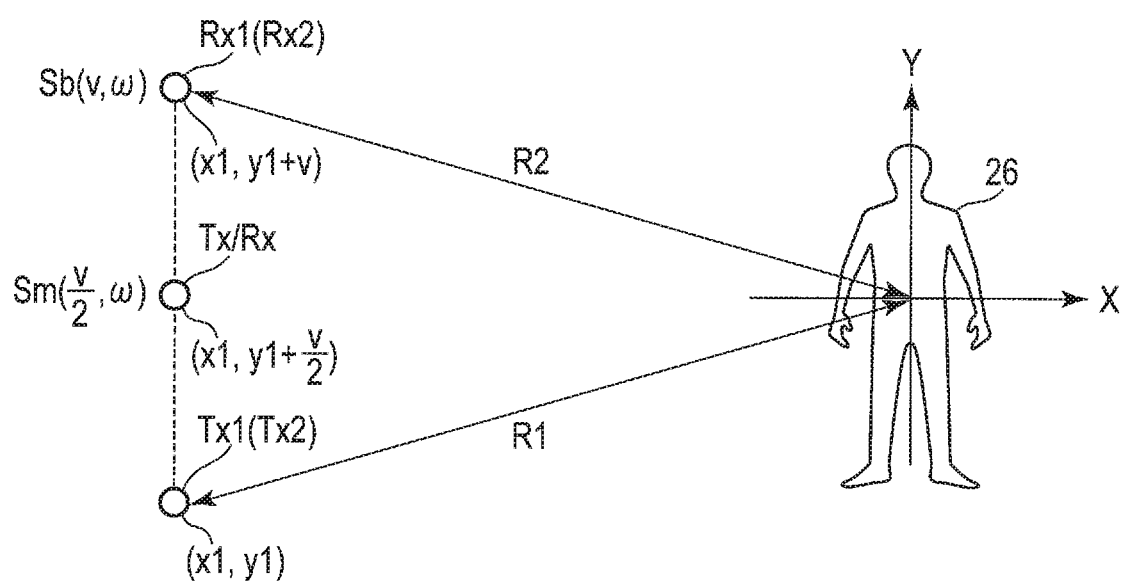
FIG. 8 illustrates an example of a process to acquire a reception signal of the array antenna 14A from a reception signal of the array antenna 14B.

FIG. 8 illustrates a state where the transmitter/receiver antenna element of the first embodiment is replaced with a pair of the transmitter antenna element and receiver antenna element of the second embodiment. With the replacement, the pair of the transmitter antenna element and receiver antenna element of the second embodiment realizes a virtual antenna element that is equivalent to the transmitter/receiver antenna element of the first embodiment. In FIG. 3, the antenna element Tx/Rx indicates one transmitter/receiver antenna element of the first embodiment. The antenna element Tx1 (or Tx2) indicates one transmitter antenna element of the second embodiment. The antenna element Rx1 (or Rx2) indicates one receiver antenna element of the second embodiment.

The coordinate of the transmitter antenna element Tx1 is set to (x1, y1), coordinate of the receiver antenna element Rx1 (or Rx2) is set to (x1, y1+v), and coordinate of the transmitter/receiver antenna element Tx/Rx is set to (x1, y1+v/2). That is, the transmitter/receiver antenna element Tx/Rx is positioned in the middle point of the transmitter antenna element Tx1 (or Tx2) and receiver antenna element Rx1 (or Rx2). Origin point of X-Y coordinate is positioned within the object 26. Note that, for convenience of explanation, X coordinates of the transmitter antenna element Tx1 (or Tx2) and receiver antenna element Rx1 (or Rx2) are the same. However, they may be different. The reception signal (complex number) of the transmitter/receiver antenna element Tx/Rx of the mono-static method is set to Sm (v/2, ω), and the reception signal (complex number) of the receiver antenna element Rx1 (or Rx2) of the bi-static method is set to Sb (v, ω).

A distance between the transmitter antenna element Tx1 (or Tx2) and the origin point of X-Y coordinate is given R1, and a distance between the receiver antenna element Rx1 (or Rx2) and the origin point of X-Y coordinate is given R2. When an absolute value of a difference between R1 and R2 is sufficiently smaller than R1, that is, |R1−R2|«R1, the following relationship is established between the reception signal of the mono-static method and the reception signal of the bi-static method.

$$Sm(v/2,\omega)=\exp(-jkv^2/4R1)Sb(v,\omega) \quad \text{Eq. 9}$$

Here, ω is an angular frequency. From Equation 9, by compensating a phase of the reception signal Sb (v, ω) of the receiver antenna element Rx1 (or Rx2) of the bi-static method, the reception signal Sm (v/2, ω) of the transmitter/receiver antenna element Tx/Rx of the mono-static method can be derived. The transmitter/receiver antenna element Tx/Rx is positioned in the middle point of the transmitter antenna element Tx1 (or Tx2) and the receiver antenna element Rx1 (or Rx2).

Figure 9:
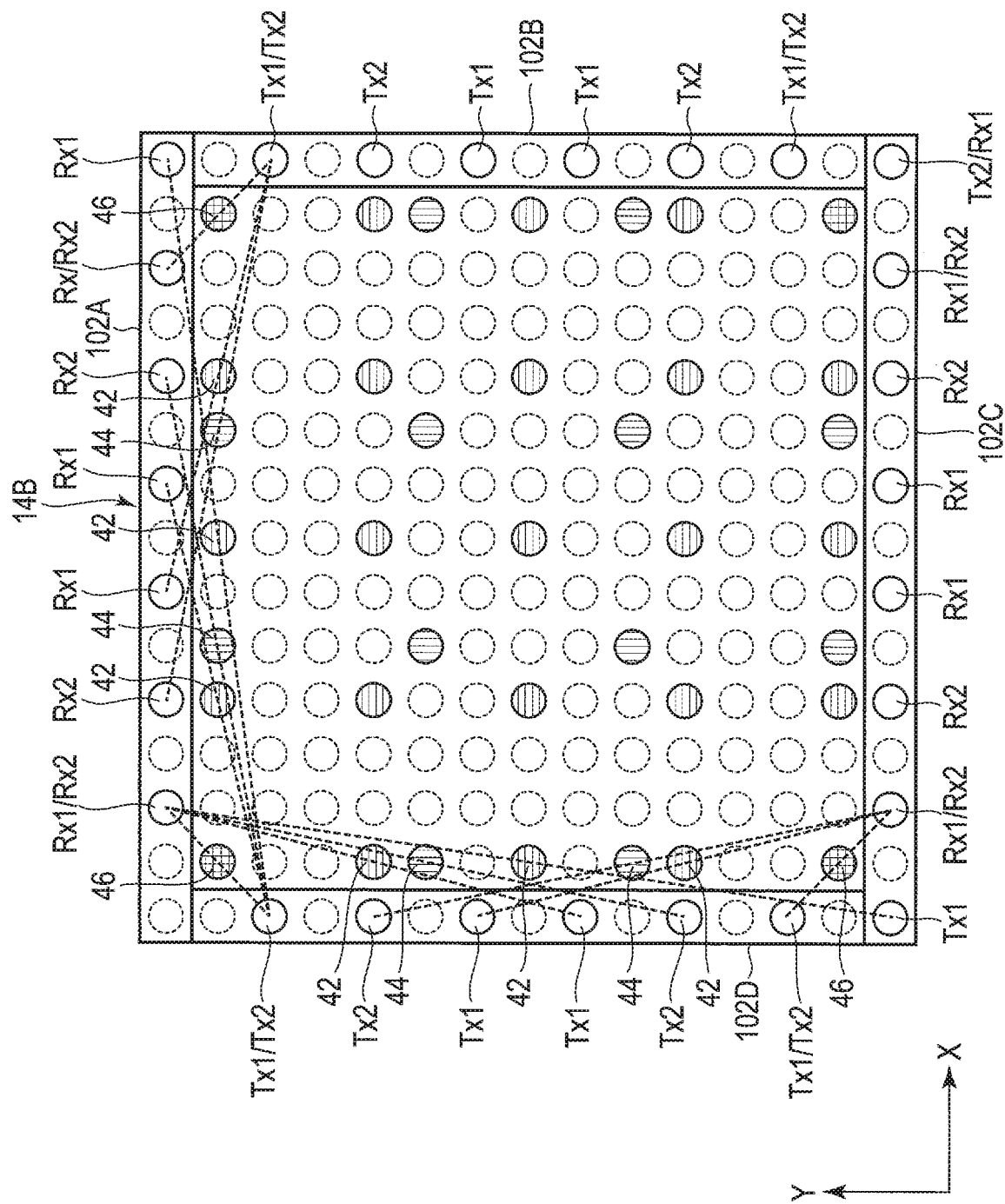
FIG. 9 illustrates an example of a state where the number of the antenna elements is reduced because of a replacement of the array antenna 14A with the array antenna 14B.
Figure 10:
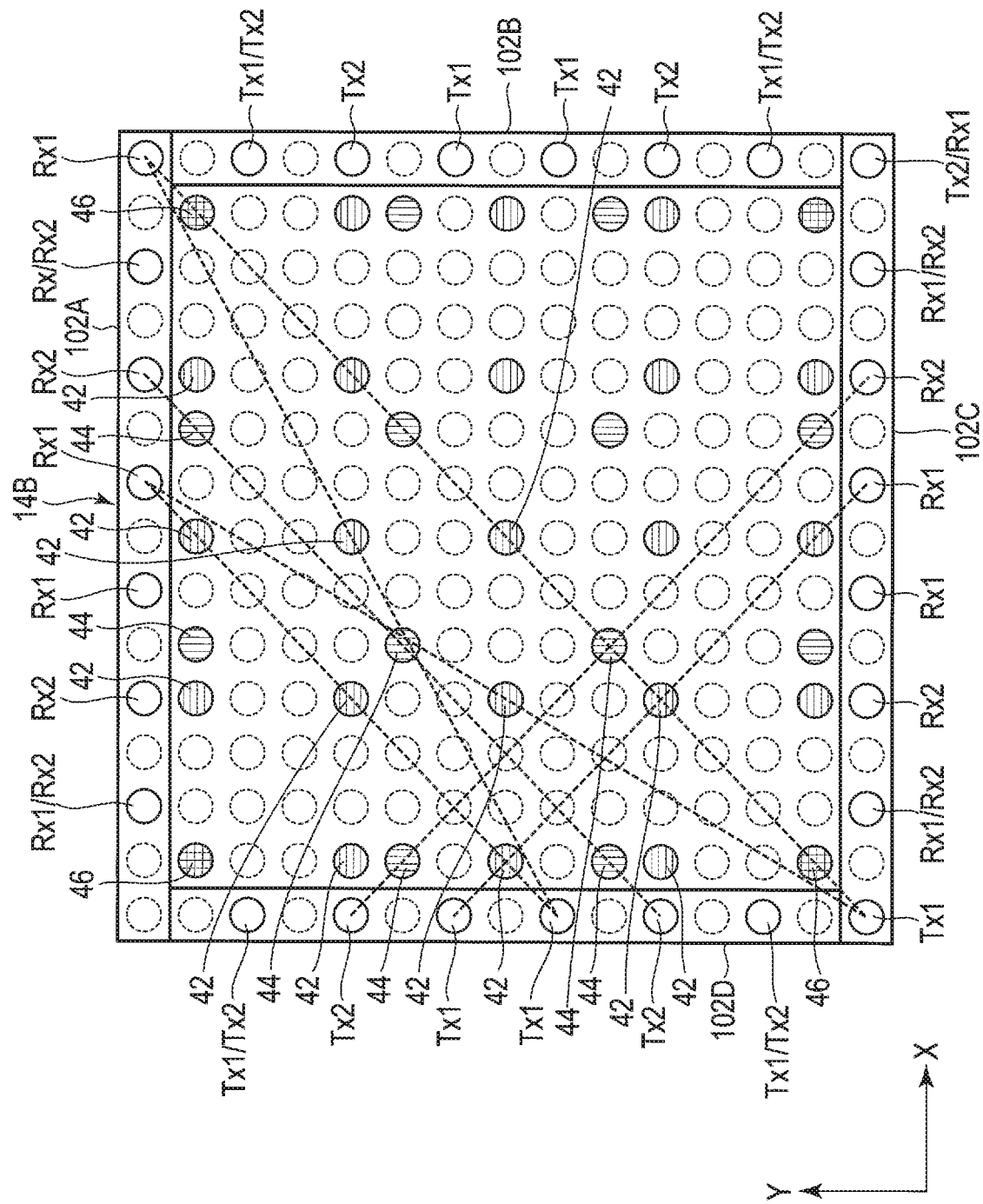
FIG. 10 illustrates the example of the state where the number of the antenna elements is reduced because of the replacement of the array antenna 14A with the array antenna 14B.

FIGS. 9 and 10 illustrate a specific example where a pair of the transmitter antenna element and the receiver antenna element of the second embodiment defines a virtual antenna element in the middle point thereof, and thus, the transmitter/receiver antenna element of the array antenna 14A can be omitted, and the number of antenna elements can be reduced.

As shown in FIG. 9, with a pair of the transmitter antenna elements Tx1, Tx2, and Tx1/Tx2 in the antenna part 102D arranged in the left side and the receiver antenna elements Rx1, Rx2, and Rx1/Rx2 in the antenna part 102A arranged in the upper side or in the antenna part 102C arranged in the lower side, the transmitter/receiver antenna elements in the periphery of the array antenna 14A are replaced.

Although this is not shown, with a pair of the transmitter antenna elements Tx1, Tx2, and Tx1/Tx2 in the antenna part 102B arranged in the right side and the receiver antenna elements Rx1, Rx2, and Rx1/Rx2 in the antenna part 102A arranged in the upper side or in the antenna part 102C arranged in the lower side, the transmitter/receiver antenna elements in the periphery of the array antenna 14A are replaced as well.

For example, with a pair of the uppermost transmitter antenna element Tx1/Tx2 of the antenna part 102D and the leftmost receiver antenna element Rx1/Rx2 of the antenna part 102A, the leftmost antenna element 46 an the uppermost row in the array antenna 14A (included in the first subarray antenna and the second subarray antenna) is replaced.

With a pair of the uppermost transmitter antenna element Tx1/Tx2 of the antenna part 102D and the fourth from the right receiver antenna element Rx1 of the antenna 102A, the fourth from the left (where the leftmost antenna element is a first from the left) antenna element 42 in the uppermost row in the array antenna 14A (included in the first subarray antenna) is replaced.

With a pair of the uppermost transmitter antenna element Tx1/Tx2 of the antenna part 102D and the third from the right and the receiver antenna element Rx2 of the antenna part 102A, the fifth from the left antenna element 42 in the uppermost row in the array antenna 14A (included in the second subarray antenna) is replaced.

With a pair of the uppermost transmitter antenna element Tx1/Tx2 of the antenna part 102D and the rightmost receiver antenna element Rx1 of the antenna part 102A, the seventh from the left (also seventh from the right) antenna element 42 in the uppermost row in the array antenna 14A (included in the first subarray antenna) is replaced.

Thereinafter, similarly, the antenna elements 42, 44, and 46 in the leftmost column, rightmost column, and lowermost row of the array antenna 14A are replaced.

The transmitter/receiver antenna elements in the array antenna 14A except the periphery are replaced with pairs of the transmitter antenna element and the receiver antenna element as shown in FIG. 10.

For example, with a pair of the fourth from the top transmitter antenna element Tx1 of the antenna part 102D and the fourth from the right receiver antenna element Rx1 of the antenna part 102A, the first antenna element 42 in the fourth row from the top (where the uppermost is first from the top) and the fourth column from the left in the array antenna 14A (included in the first subarray antenna) is replaced.

With a pair of the fifth from the top transmitter antenna element Tx2 of the antenna part 102D and the second from the right receiver antenna element Rx2 of the antenna part 102A, the second antenna element 44 in the fifth row from the top and fifth column from the left in the array antenna 14A (included in the second subarray antenna) is replaced.

With a pair of the leftmost transmitter antenna element Tx1 of the antenna part 102C and the rightmost receiver antenna element Rx1 of the antenna part 102A, the first antenna element 42 in the center row (where seventh from both the top and the bottom) and the center column (where seventh from both the top and the bottom) in the array antenna 14A (included in the first subarray antenna) is replaced.

With a pair of the fourth from the top transmitter antenna element Tx1 of the antenna part 102D and the rightmost receiver antenna element Rx1 of the antenna part 102A, the first antenna element 42 in the fourth row from the top and seventh column from the left (and also seventh column from the right) in the array antenna 14A (included in the first subarray antenna) is replaced.

With a pair of the leftmost transmitter antenna element Tx1 of the antenna part 102C and the fourth from the right receiver antenna element Rx1 of the antenna part 102A, the first antenna element 42 in the seventh row from the top and fourth column from the left in the array antenna 14A (included in the first subarray antenna) is replaced.

As can be understood from the above, from the reception signal of the receiver antenna element of the array antenna 14B of the second embodiment, the reception signals of the antenna element of the first subarray antenna and the second subarray antenna of the array antenna 14A of the first embodiment can be derived. According to the second embodiment, virtual antenna elements that are equivalent to the antenna elements of the array antenna 14A can be realized without the array antenna 14A of the first embodiment.

Thus, according to the second embodiment, the controller 40 of the detection device 12 sequentially sets pairs of the transmitter antenna elements Tx and receiver antenna elements Rx in which middle points coincide with the antenna elements of the first subarray antenna of the array antenna 14A of the first embodiment. The controller 40 makes the transmitter antenna elements Tx of the pair transmit an electromagnetic wave, and makes the receiver antenna elements Rx of the pair receive the electromagnetic wave reflected by the object 26. Thus, the reception signal equivalent to the reception signal by the antenna elements of the first subarray antenna of the array antenna 14A can be obtained. In the same manner as the first embodiment, a first image is generated based on the reception signal. Then, similarly, the controller 40 sequentially sets pairs of the transmitter antenna elements Tx and receiver antenna elements Rx in which middle points coincide with the antenna elements of the second subarray antenna of the array antenna 14A. The controller 40 makes the transmitter antenna elements Tx of the pair transmit an electromagnetic wave, and makes the receiver antenna elements Rx of the pair receive the electromagnetic wave reflected by the object 26. Thus, the reception signal equivalent to the reception signal by the antenna elements of the second subarray antenna of the array antenna 14A can be obtained. In the same manner as the first embodiment, the second image is generated based on the reception signal, and the first and second images are combined to generate a synthesized image.

According to the second embodiment, from the reception signal of the receiver antenna elements of the bi-static method, the reception signal of the transmitter/receiver antenna element of the mono-static method positioned in the middle point of the transmitter antenna element and the receiver antenna element of the bi-static method is derived. Therefore, an array antenna of the bi-static method including antenna elements less than those of the array antenna of the mono-static method of the first embodiment can be achieved. The array antenna of the bi-static method can obtain reception signals that are equivalent to those of the antenna elements of the array antenna of the first embodiment. Thus, according to the second embodiment, the number of antenna elements of the array antenna can be reduced as compared to the first embodiment, the transmission/reception time can further be shortened, the data amount of the reception signal can further be suppressed, and the calculating time can further be cut. Note that, in the second embodiment, spacing between adjacent antenna elements is wider than half of the wavelength, and thus, interference between adjacent antenna elements does not occur.

Third Embodiment

FIG. 11 illustrates an example of an array antenna 14C of an electronic apparatus of a third embodiment. The third embodiment uses both the mono-static method and the bi-static method. The multi-static method may be used instead of the bi-static method. The array antenna 140 includes, for example, thirteen antenna elements, which is less than twenty-seven antenna elements of the second embodiment. Thirteen antenna devises include transmitter antenna elements, receiver antenna elements, and transmitter/receiver antenna elements. As in the second embodiment, most of the antenna elements 42, 44, and 46 of the first embodiment are replaced with pairs of one transmitter antenna element and one receiver antenna element of the third embodiment. As a result, the number of antenna elements is reduced. With pairs of one transmitter antenna element, and receiver antenna elements, or with pairs of transmitter antenna elements and one receiver antenna elements, the array antenna 140 including thirteen antenna elements which are less than thirty-seven antenna elements can achieve the same function as that of the array antenna 14A.

According to the second embodiment, the array antenna 14B arranged in a frame at four outer peripheries of the square area corresponding to the array antenna 14A is used. However, according to the third embodiment, a cross-shaped array antenna 140 formed in and around the area corresponding to the array antenna 14A. The center of the cross-shape (crossing point) is the center of the area corresponding to the array antenna 14A.

The array antenna 14C of the third embodiment is formed on a substrate that is four times larger than the array antenna 14A. In FIG. 11, the inner smaller square of two squares indicates the area corresponding to the array antenna 14A. The array antenna 14C includes a linear antenna part 104A extending in the axis X direction, and a linear antenna part 104B extending in the axis Y direction to orthogonal to the antenna part 104A at the middle point thereof. A virtual lattice of half of the wavelength of the array antenna 14A is set in the area of the array antenna 14C, and antenna elements are arranged on every some crossing points of the virtual lattice. Thus, spacing D5 between adjacent antenna elements of the array antenna 14C is wider than half of the wavelength.

The antenna part 104A includes seven antenna elements. Two antenna elements Tx1 of the seven antenna elements are transmitter antenna elements corresponding to the antenna elements 42 of the first subarray antenna of the first embodiment. Two antenna elements Tx2 of the seven antenna elements are transmitter antenna elements corresponding to the antenna elements 44 of the second subarray antenna of the first embodiment. Two antenna elements Tx1/Tx2 of the seven antenna elements are transmitter antenna elements corresponding to both the antenna elements 42 and 44 of the first and second subarray antennas of the first embodiment. One antenna element Tx1/Rx2 of the seven antenna elements is a transmitter/receiver antenna element corresponding to the antenna element 42 of the first subarray antenna positioned at the virtual lattice crossing point in the center of the array antenna 14A of the first embodiment.

The antenna part 104B includes six antenna elements. Two antenna elements Rx1 of the six antenna elements are receiver antenna elements corresponding to the antenna elements 42 of the first subarray antenna of the first embodiment. Two antenna elements Rx2 of the six antenna elements are receiver antenna elements corresponding to the antenna elements 44 of the second subarray antenna of the first embodiment. Two antenna elements Rx1/Rx2 of the six antenna elements are receiver antenna elements corresponding to the antenna elements 42 and 44 of the first and second subarray antennas of the first embodiment.

The transmitter/receiver antenna element Tx1/Rx1 explained above in relation to the antenna part 104A may be included in both the antenna part 104A and the antenna part 104B. However, for convenience of explanation, Tx1/Rx1 is included in the antenna part 104A. Alternatively, the transmitter/receiver antenna element Tx1/Rx1 may not be included in the antenna part 104A but may be included in the antenna part 104B.

The antenna element Tx1/Rx1 is an antenna element of the mono-static method, and other antenna elements are antenna elements of the bi-static method or of the multi-static method. In the bi-static method, one transmitter antenna element Tx transmits an electromagnetic wave, and one receiver antenna element Rx receives electromagnetic wave. In the multi-static method, one transmitter antenna element Tx transmits an electromagnetic wave and receiver antenna elements Rx receive the electromagnetic wave at the same time.

According to the first embodiment, the transmitters 32 and receivers 34 are connected to the antenna elements 42, 44, and 46. However, according to the third embodiment, the receivers 34 are not connected to the transmitter antenna elements Tx1 and Tx2, the transmitters 32 are not connected to the receiver antenna elements Rx1 and Rx2, and the transmitters 32 and receivers 34 are connected to the transmitter/receiver antenna element Tx1/Rx1. Other structures than the detection device 12 of FIG. 1 are the same in the third embodiment.

Figure 12:
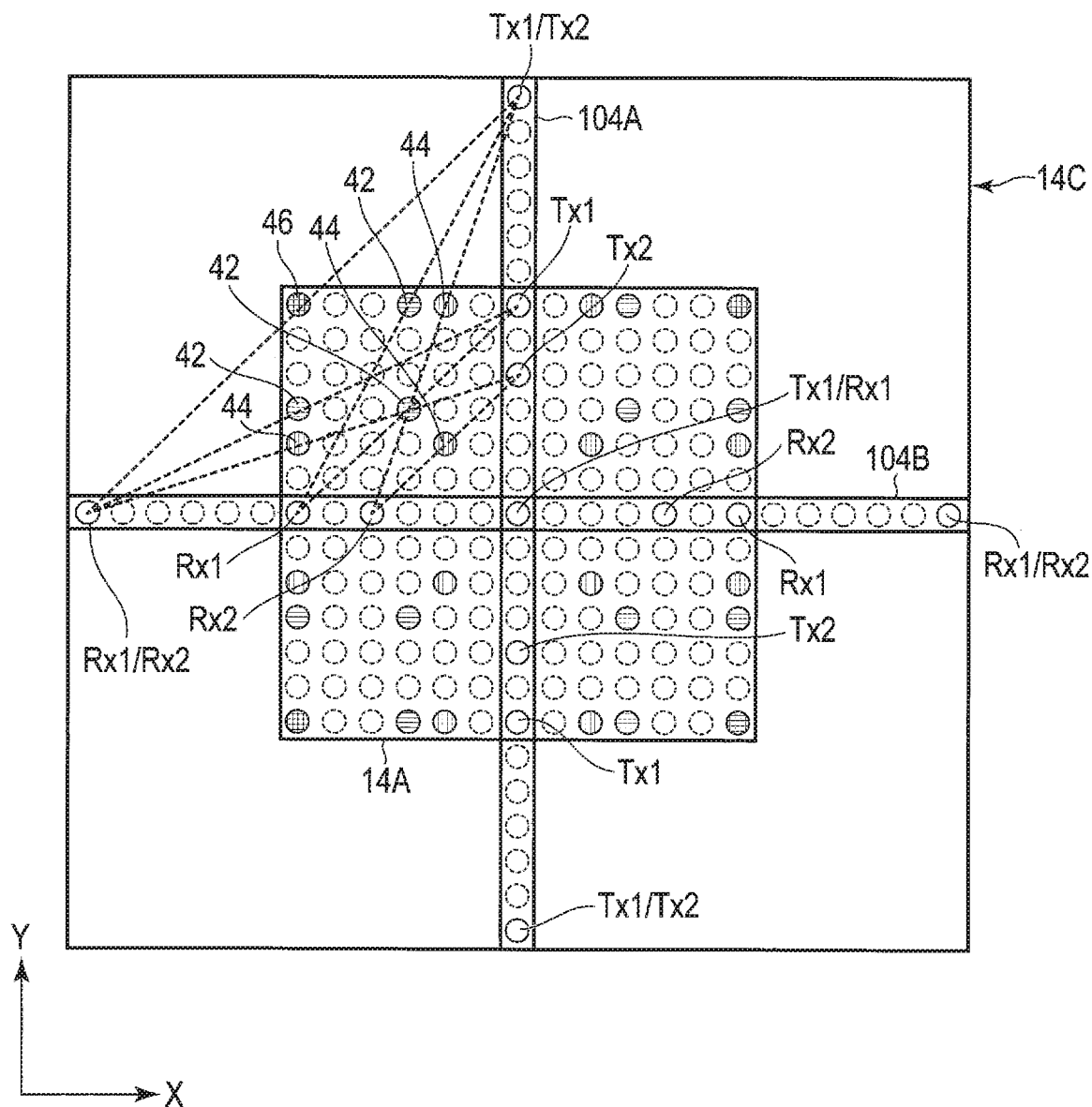
FIG. 12 illustrates an example of the state where the number of the antenna elements is reduced because of a replacement of the array antenna 14A with the array antenna 14C.

FIG. 12 illustrates a state where the number of antenna elements is reduced because of replacement of the transmitter/receiver antenna elements of the first embodiment with a pair of the transmitter antenna element and the receiver antenna element of the third embodiment.

For example, with a pair of the uppermost transmitter antenna element Tx1/Tx2 of the antenna part 104A and the leftmost receiver antenna element Rx1/Rx2 of the antenna part 104B, the leftmost antenna element 46 in the uppermost row in the array antenna 14A is replaced. The leftmost antenna element 46 is included in the first and second subarray antennas.

With a pair of the uppermost transmitter antenna element Tx1/Tx2 of the antenna part 104A and the second from the left receiver antenna element Rx1 of the antenna part 104B, the fourth from the left antenna element 42 in the uppermost row an the array antenna 141 (included in the first subarray antenna) is replaced.

With a pair of the uppermost transmitter antenna element Tx1/Tx2 of the antenna part 104A and the third from the left receiver antenna element Rx2 of the antenna part 104B, the first antenna element 44 in the uppermost row and fifth column from the left in the array antenna 14A (included in the second subarray antenna) is replaced.

With a pair of the second from the top transmitter antenna element Tx1 of the antenna part 104A and the leftmost receiver antenna element Rx1/Rx2 of the antenna part 104B, the antenna element 42 in the fourth row from the top and leftmost column in the array antenna 14A (included in the first subarray antenna) is replaced.

With a pair of the second from the top transmitter antenna element Tx1 of the antenna part 104A and the second from the left receiver antenna element Rx1 of the antenna part 104B, the antenna element 42 in the fourth row from the top and fourth column from the left in the array antenna 14A (included in the first subarray antenna) is replaced.

With a pair of the third from the top transmitter antenna element Tx2 of the antenna part 104A and the leftmost receiver antenna element Rx1/Rx2 of the antenna part 104B, the antenna element 44 in the fifth row from the top and leftmost column in the array antenna 14A (included in the second subarray antenna) is replaced.

With a pair of the third from the top transmitter antenna element Tx2 of the antenna part 104A and the third from the left receiver antenna element Rx2 of the antenna part 104B, the antenna element 44 in the fifth row from the top and fifth column from the left in the array antenna 14A (included in the second subarray antenna) is replaced.

Thereinafter, similarly, the antenna elements 42, 44, and 46 are replaced in one-fourth area in the upper right, one-fourth area in the lower right, one-fourth area of the lower left of the array antenna 14A.

Note that, unlike the array antenna 14B of the second embodiment that is arranged only outside the area corresponding to the array antenna 14A, the array antenna 14C is also arranged inside the area corresponding to the array antenna 14A. Thus, the antenna elements in the center row and in the center column in the area corresponding to the array antenna 14A are the antenna elements of the array antenna 14C, and are not replaced with the pairs of the antenna elements of the array antenna 14C.

As can be understood from the above, from the reception signal of the receiver antenna element of the array antenna 14C of the third embodiment, the reception signals of the antenna elements of the first and second subarray antennas of the array antenna 14A of the first embodiment can be derived.

According to the third embodiment, the controller 40 of the detection device 12 sequentially sets pairs of the transmitter antenna elements Tx and receiver antenna elements Rx in which middle points coincide with the antenna elements of the first subarray antenna of the array antenna 14A of the first embodiment. The controller 40 makes the transmitter antenna elements Tx of the pair transmit an electromagnetic wave, and makes the receiver antenna elements Rx of the pair and the receiver antenna elements Rx1 and Rx2 of the array antenna 14C receive the electromagnetic wave reflected by the object 26. Thus, the reception signal equivalent to the reception signal by the antenna elements of the first subarray antenna of the array antenna 14A can be obtained. In the same manner as the first embodiment, a first image is generated based on the reception signal. Then, similarly, the controller 40 sequentially sets pairs of the transmitter antenna elements Tx and receiver antenna elements Rx in which the middle points coincide with the antenna elements of the second subarray antenna of the array antenna 14A of the first embodiment. The controller 40 makes the transmitter antenna elements Tx of the pair transmit an electromagnetic wave, and makes the receiver antenna element Rx of the pair and the receiver antenna elements Rx1 and Rx2 of the array antenna 14C receive the electromagnetic wave reflected by the object 26. Thus, the reception signal equivalent to the reception signal by the antenna elements of the second subarray antenna of the array antenna 14A can be obtained. As in the first embodiment, the second image is generated based on the reception signal, and the first and second images are combined to generate a synthesized image.

According to the third embodiment, a line of transmitter antenna elements with spacing wider than half of the wavelength and a lane of receiver antenna elements with spacing wider than half of the wavelength are arranged inside and outside the area corresponding to the array antenna 14A of the first embodiment in a cross shape. Therefore, the transmitter/receiver antenna elements of the first embodiment are replaced with a pair of a transmitter antenna element and receiver antenna element. By defining several antenna pairs with one transmitter antenna element or one receiver antenna element, the number of antenna elements of the array antenna can be reduced to thirteen from thirty-seven. Thus, the transmission/reception time can further be shortened, the data amount of the reception signal can further be suppressed, and the calculating time can further be cut. Note that, in the third embodiment, spacing between adjacent antenna elements is wider than half of the wavelength, and thus, interference between adjacent antenna elements does not occur.

Fourth Embodiment

Figure 13:
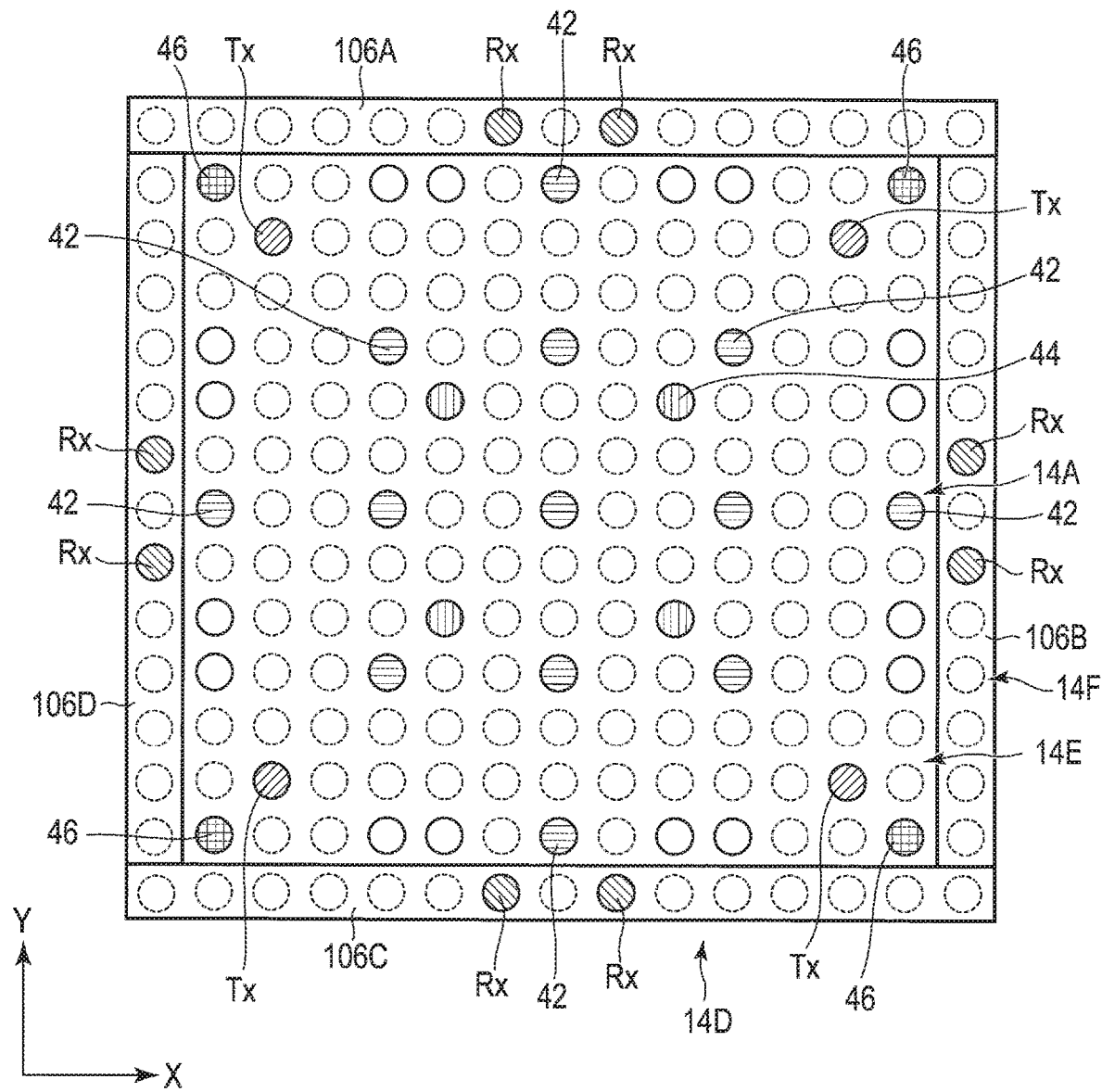
FIG. 13 illustrates an example of an array antenna 14D according to a fourth embodiment.
Figure 14:
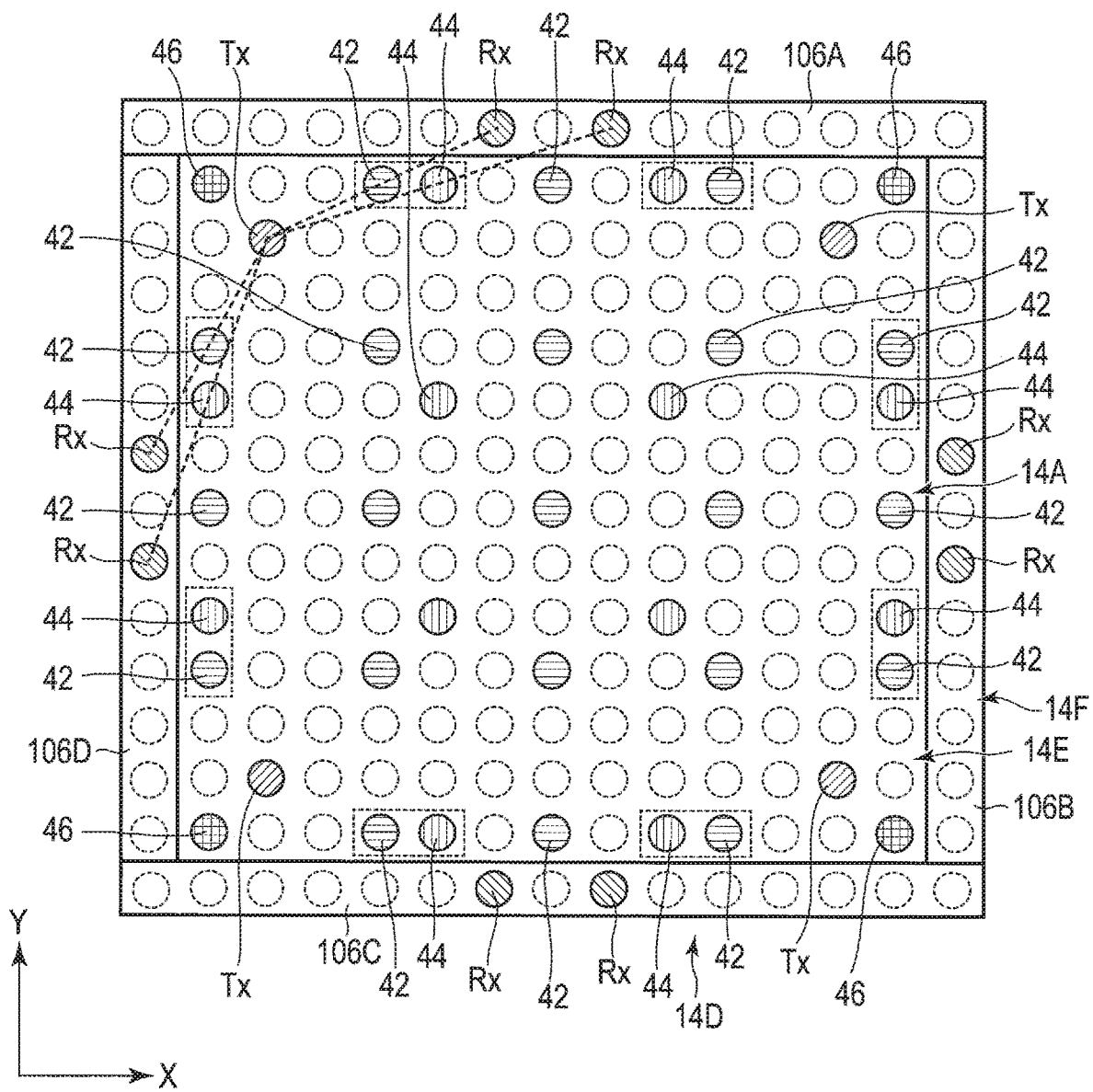
FIG. 14 illustrates an example of the state where the number of the antenna elements is reduced because of a replacement of a part of the array antenna 14A with the array antenna 14D.

FIG. 13 illustrates an example of an array antenna 14D of an electronic apparatus of a fourth embodiment. FIG. 14 illustrates a state where the number of antenna elements is reduced because of replacement of a part of antenna elements of the array antenna 14A with the array antenna 14D. The fourth embodiment uses both the mono-static method and the bi-static method. The array antenna 14D of the fourth embodiment is formed on a substrate that is the same size as the area in which the array antenna 14B of the second embodiment is formed, and the array antenna 14D includes array antennas 14E and 14F.

The array antenna 14E is formed by adding four transmitter antenna elements Tx to an array antenna in which two sparse subarray antenna are mixed as in the array antenna 14A of the first embodiment, spacing D1 of the antenna elements of the first subarray antenna and spacing D2 of the antenna element of the second subarray antenna being coprime (for example, D1=3×d, D2=4×d). A virtual lattice of half of the wavelength is set in the area of the array antenna 14E, and the antenna elements Tx are positioned at crossing points of the virtual lattice. The antenna elements other than four transmitter antenna elements Tx of the array antenna 14E are transmitter/receiver antenna elements 42, 44, and 46 as in the first embodiment. Spacing of all antenna elements is wider than half of the wavelength.

The array antenna 14F includes, in the same manner as the array antenna 14B of the second embodiment, four linear antenna parts 106A, 106B, 106C, and 106D arranged in a frame at four outer peripheries of the array antenna 14E. The virtual lattice of half of the wavelength of the array antenna 14E is extended to the area of the array antenna 14F. The receiver antenna elements Rx are arranged at some crossing points of the virtual lattice of the array antenna 14F. Spacing between adjacent receiver antenna elements Rx and spacing between adjacent receiver antenna elements Rx and the antenna elements 42 and 44 in the array antenna 14E are wider than half of the wavelength.

The array antenna part 106A arranged outside the upper end of the array antenna 14E and extending in the direction X includes two receiver antenna elements Rx at spacing λ that is two times half of the wavelength in the center part. The antenna part 106C arranged outside the lower end of the array antenna 14D and extending in the direction X includes two receiver antenna elements Rx at spacing λ in the center part. The antenna part 106B arranged outside the right end of the array antenna 14D and extending in the direction Y includes two receiver antenna elements Rx at spacing λ in the center part. The antenna part 106D arranged outside the left end of the array antenna 14D and extending in the direction Y includes two receiver antenna elements Rx at spacing λ in the center part.

As described above, the array antenna 14F includes, for example, eight antenna elements that are less than thirteen antenna elements of the third embodiment. According to the second and third embodiments, all transmitter/receiver antenna elements of the first embodiment are replaced with pairs of the transmitter antenna elements and receiver antenna elements. However, according to the fourth embodiment, only a part of the transmitter/receiver antenna elements of the first embodiment are replaced with pairs of the transmitter antenna elements and receiver antenna elements.

For example, four transmitter antenna elements Tx are added to the array antenna 14A of the first embodiment, and eight receiver antenna elements Rx are added to the outside of the array antenna 14A, and thus, sixteen antenna elements in the array antenna 14A of the first embodiment can be omitted. Thus, the array antenna 14A of the first embodiment includes thirty-seven antenna elements while, as shown in FIG. 13, the array antenna 14E of the fourth embodiment includes twenty-five antenna elements. Although eight antenna elements of the array antenna 14F are added, the array antenna 14D of the fourth embodiment includes thirty-three antenna elements, and thus, the number of antenna elements is reduced as compared to the array antenna 14A of the first embodiment.

FIG. 14 illustrates an example of a state where the number of antenna elements is reduced because of replacement of the array antennas of the first embodiment of the mono-static method with the array antenna of the fourth embodiment of the bi-static method.

For example, with two pairs of a transmitter antenna element Tx in the second row from the top and second column from the left of the array antenna 14E and two receiver antenna elements Rx of the antenna part 106A, the antenna element 42 (included in the first subarray antenna) in the top row and fourth column form the left and the antenna element 44 (included in the second subarray antenna) in the top row and fifth column from the left of the array antenna 14A of the first embodiment are replaced. The two antenna elements to be replaced are enclosed by a broken rectangular in FIG. 14.

With two pairs of the transmitter antenna element Tx in the second row from the top and second column from the left of the array antenna 14E and the two receiver antenna elements Rx of the antenna part 106D, the antenna element 42 in the fourth row from the top and leftmost column (included in the first subarray antenna) and the antenna element 44 in the fifth row from the top and leftmost column (included in the second subarray antenna) of the array antenna 14A of the first embodiment are replaced.

Thereinafter, similarly, twelve antenna elements 42 and 44 of the array antenna 14A of the first embodiment are replaced with four pairs of the transmitter antenna element Tx in the second row from the top and second column from the right of the array antenna 14E and the two receiver antenna elements Rx of the antenna parts 106A and 106B, four pairs of the transmitter antenna element Tx in the second row from the bottom and second column from the right of the array antenna 14E and the two receiver antenna elements Rx of the antenna parts 106B and 106C, and four pairs of the transmitter antenna element Tx in the second row from the bottom and second column from the left and the two receiver antenna elements Rx of the antenna parts 106C and 106D.

According to the fourth embodiment, the controller 40 makes the antenna elements of the first subarray antenna of the array antenna 14A of the first embodiment transmit an electromagnetic wave, and makes the transmitter antenna element Tx forming a pair with the receiver antenna element Rx transmit an electromagnetic wave. A middle point of the transmitter antenna element Tx and the receiver antenna element Rx of the pair coincides with the antenna elements of the first subarray antenna of the array antenna 14A of the first embodiment, as enclosed by the broken rectangular. The controller 40 makes the receiver antenna elements Rx of the pair receive the electromagnetic wave reflected by the object 26. Thus, the reception signal equivalent to the reception signal by the antenna elements of the first subarray antenna of the array antenna 14A of the first embodiment can be obtained. As in the first embodiment, the first image is generated based on the reception signal.

Then, similarly, the controller 40 makes the antenna elements of the second subarray antenna of the array antenna 14A of the first embodiment transmit electromagnetic wave, and makes the transmitter antenna element Tx forming a pair with the receiver antenna element Rx transmit an electromagnetic wave. A middle point of the transmitter antenna element Tx and the receiver antenna element Rx of the pair coincides with the antenna elements of the second subarray antenna of the array antenna 14A of the first embodiment, as enclosed by the broken rectangular. The controller 40 makes the receiver antenna elements Rx of the pair receive the electromagnetic wave reflected by the object 26. Thus, the reception signal equivalent to the reception signal by the antenna elements of the second subarray antenna of the array antenna 14A of the first embodiment can be obtained. As in the first embodiment, the second image is generated based on the reception signal, and the first and second images are combined to generate a synthesized image.

According to the fourth embodiment, by adding the transmitter antenna elements Tx to the array antenna 14A of the first embodiment and the receiver antenna elements Rx to the outside of the array antenna of the first embodiment, the antenna elements of the mono-static method of the first embodiment are replaced with the antenna elements of the bi-static method. Thus, the number of antenna elements in total can be reduced, the transmission/reception time can further be shortened, the data amount of the reception signal can further be suppressed, and the calculating time can further be cut. Note that, in the fourth embodiment, spacing between adjacent antenna elements is wider than half of the wavelength, and thus, interference between adjacent antenna elements does not occur.

Fifth Embodiment

Figure 15:
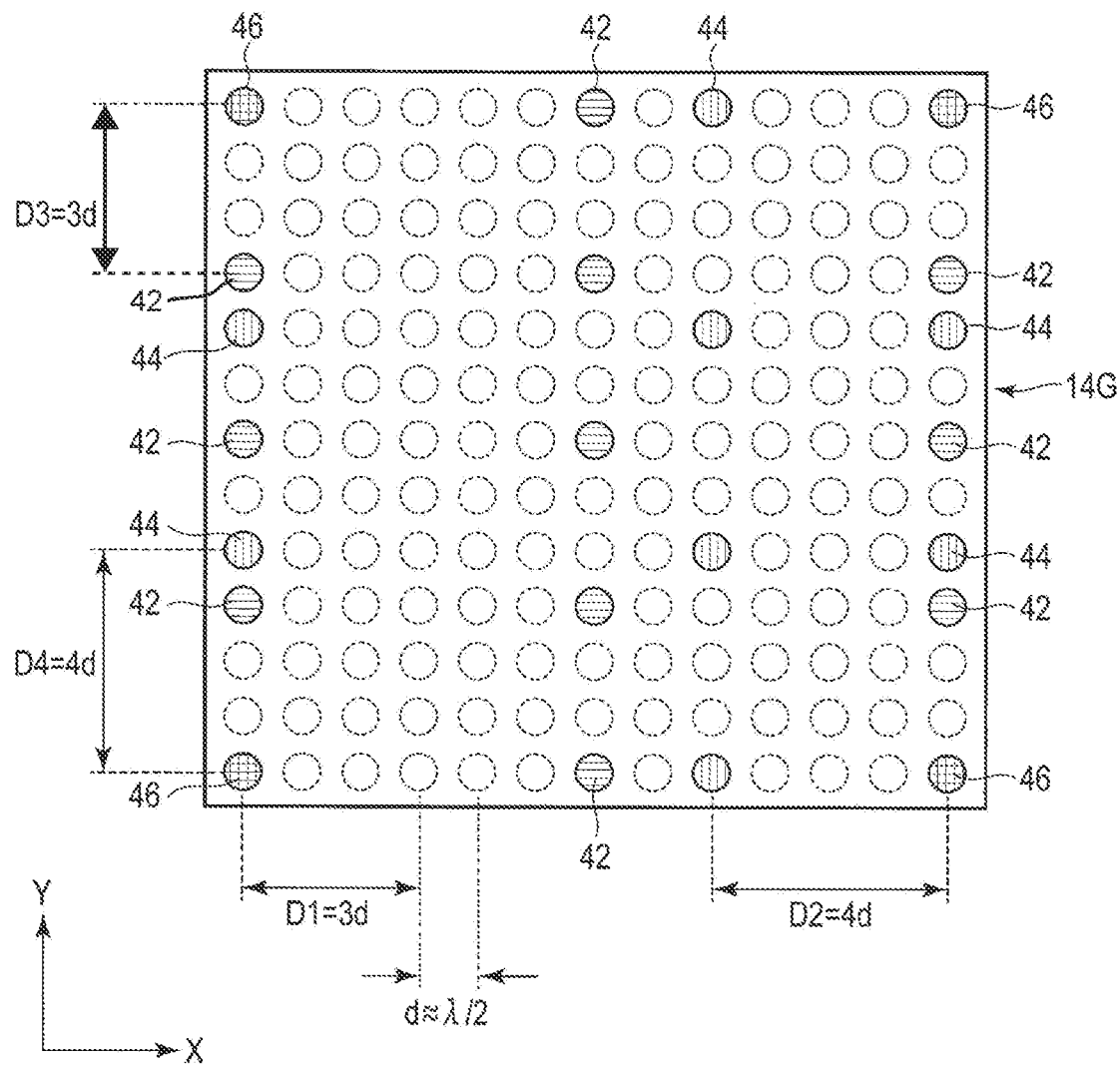
FIG. 15 illustrates an example of an array antenna 14G according to a fifth embodiment.

FIG. 15 illustrates an example of an array antenna 14G of an electronic apparatus of a fifth embodiment. The fifth embodiment uses both the mono-static method and the bi-static method. The array antenna 14G of the fifth embodiment is a variation of the array antenna 14A of the first embodiment, and some antenna elements of the array antenna 14A are omitted therein.

For example, in the array antenna 14G, five antenna elements 42 in the fourth column from the left, four antenna elements 44 in the fifth column from the left, and five antenna elements 42 in the tenth column from the left (fourth column from the right) of the array antenna 14A are omitted. Thus, the number of antenna elements of the array antenna 14G is twenty-three which is fewer than thirty-seven antenna elements of the array antenna 14A. The other structure is the same as in FIG. 2. That is, a virtual lattice of half in of the wavelength is defined in the array antenna 14G, and antenna elements 42, 44, and 46 are arranged at some crossing points of the virtual lattice. The antenna elements 42, 44, and 46 are arranged two-dimensionally in the directions X and Y and separated by a spacing that is a few times wider than spacing ($\lambda$/2) of the virtual lattice with some exception. In the array antenna 14G of the fifth embodiment, antenna elements in the fourth, fifth, and tenth columns from the left are omitted, and thus, the number of antenna elements separated by half of the wavelength is reduced as compared to the array antenna 14A of the first embodiment, and interference between adjacent antenna elements does not occur.

FIG. 16 illustrates an example of a state where the number of antenna elements is reduced as a result of a partial replacement of the array antenna 14A of the first embodiment with the array antenna 14G of the fifth embodiment.

For example, with pairs of five antenna elements 42 and 46 in the leftmost column of the array antenna 14G and five antenna elements 42 in the same row and seventh column from the left (seventh column from the right) of the first subarray antenna, reception signals of five antenna elements 42 of the first subarray antenna in the same row and fourth column from the left which have been positioned in the middle points between the above antenna elements but omitted can be derived.

Similarly, with pairs of five antenna elements 42 and 46 in the leftmost column of the array antenna 14G and five antenna elements 44 in the same row and ninth column from the left (fifth column from the right) of the second subarray antenna, reception signals of five antenna elements 44 of the second subarray antenna in the same row and fifth column from the left which have been positioned in the middle points between the above antenna elements but omitted can be derived.

With pairs of five antenna elements 42 and 46 in the rightmost column of the array antenna 14G and five antenna elements 42 in the same row and seventh column from the left (seventh column from the right) of the first subarray antenna, reception signals of five antenna elements 42 of the first subarray antenna in the same row and tenth column from the left (fourth column from the right) which have been positioned in the middle points between the above antenna elements but omitted can be derived.

Note that, between a pair of antenna elements, the transmitter antenna element and receiver antenna element can be chosen optionally.

According to the fifth embodiment, the controller 40 makes the antenna elements of the mono-static method of the first subarray antenna of the array antenna 14A of the first embodiment transmit an electromagnetic wave, makes one antenna element of a pair of antenna elements of the bi-static method of FIG. 16 transmit an electromagnetic wave, and makes an antenna element of the mono-static method or the other antenna element of the pair of the antenna elements of the bi-static method receive the electromagnetic wave reflected by the object 26. Thus, the reception signal equivalent to the reception signal by the antenna elements of the first subarray antenna of the array antenna 14A of the first embodiment can be obtained. As in the first embodiment, the first image is generated based on the reception signal.

Then, similarly, the controller 40 makes the antenna elements of the mono-static method of the second subarray antenna of the array antenna 14A of the second embodiment transmit an electromagnetic wave, makes one antenna element of a pair antenna elements of the bi-static method of FIG. 16 transmit an electromagnetic wave, and makes an antenna element of mono-static method or the other antenna element of the pair of the antenna elements of the bi-static method receive the electromagnetic wave reflected by the object 26. Thus, the reception signal equivalent to the reception signal by the antenna elements of the second subarray antenna of the array antenna 14A of the first embodiment can be obtained. As in the first embodiment, the second image is generated based on the reception signal, and the first and second images are combined to generate a synthesized image.

According to the fifth embodiment, a part of the transmitter/receiver antenna elements of the array antenna 14A of the first embodiment functions as a transmitter antenna element and another part thereof functions as a receiver antenna element. A reception signal of a transmitter/receiver antenna element positioned in the middle point between the transmitter antenna element and the receiver antenna element is obtained. Thus, the array antenna 14A of the first embodiment can be used to transmit and receive signal by the mono-static method and the bi-static method. The accuracy is increased as compared to a case where the transmission/reception is formed through the bi-static method alone. The number of antenna elements can be reduced (to twenty-five from thirty-seven). Thus, the transmission/reception time can further be shortened, the data amount of the reception signal can further be suppressed, and the calculating time can further be cut. Note that, in the fifth embodiment, spacing between adjacent antenna elements is wider than half of the wavelength, and thus, interference between adjacent antenna elements does not occur.

Sixth Embodiment

Figure 17:
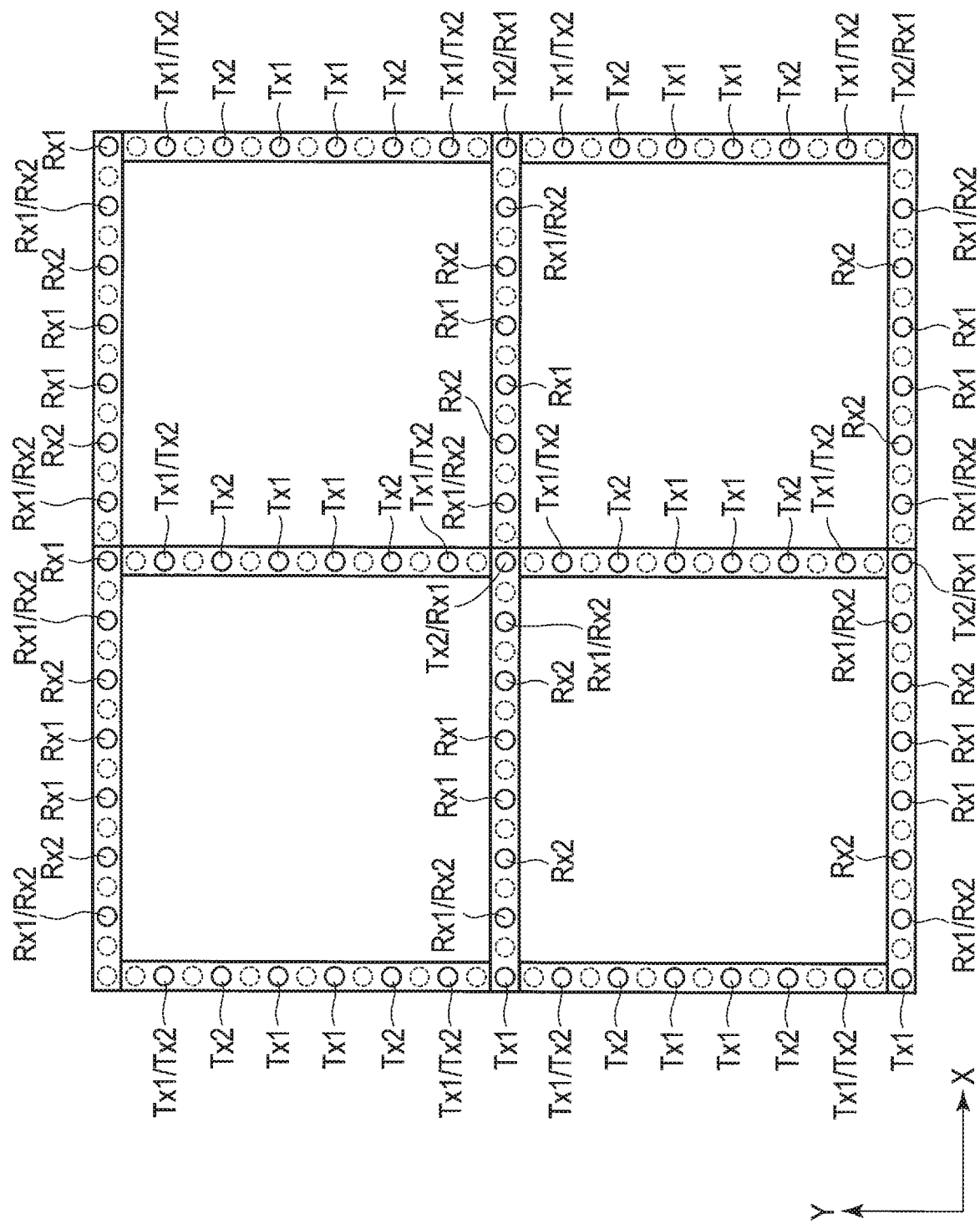
FIG. 17 illustrates an example of an array antenna according to a sixth embodiment.

FIG. 17 illustrates an example of an electronic apparatus of a sixth embodiment. Generation of grating lobes in the transmission/reception performed by two coprime array antennas in which spacing between adjacent antenna elements are coprime can be suppressed by increasing the size of the array antennas. An array antenna of greater size may be difficult to be formed on a substrate of greater size. Instead, thereof, an array antenna of greater size may be formed by combining substrates of smaller sizes on each of which a smaller array antenna is formed. According to the sixth embodiment, an array antenna of four times greater is formed by combining any four of the array antenna substrates of the first to fifth embodiments. The same array antennas of one of the first to fifth embodiments may be adhered, or the array antennas of different embodiments may be adhered. FIG. 17 illustrates an example where four of array antennas 14B of the second embodiment shown in FIG. 7 are adhered vertically and horizontally. Note that the number of array antennas to be adhered is not limited to four, and may be two, three, or five or more. The adhesion may not be performed vertically and horizontally, and may be vertically, or horizontally.

Note that the present invention is not limited to the above-mentioned embodiments, and may be realized with changes to the structural elements without departing from the scope of the invention. Furthermore, various inventions can be formed by arbitral combinations of the structural elements of the above-described embodiments.

For example, a coprime combination is not limited to 3 and 4, and may be a combination of positive integers that are two or more. The arrangement of the transmitter antenna elements Tx and the receiver antenna elements Rx of the second to fifth embodiments is optional as long as desired antenna elements can be replaced, and the design can be changed freely. According to the fifth embodiment, the replacement as is not limited to the example described, and other antenna elements can be replaced with other pairs of antenna elements. The electromagnetic wave is not limited to extra high frequency band, and may be other frequency band such as extra high frequency band, ultra high frequency band, and the like. A method for combining two images formed by two subarray antennas in order to cancel phantoms therein is not limited to a minimum value selection method and may be other canceling methods.

What is claimed is:

1. An electronic apparatus comprising:
   antenna elements arranged in a two-dimensional area, the antenna elements comprising first antenna elements and second antenna elements; and
   processor circuitry configured to control the first antenna elements and the second antenna elements and receive an electromagnetic wave,
   wherein:
   the first antenna elements are arranged in a first direction and separated by a first distance, the first distance is m times half of a wavelength of the electromagnetic wave, m is a positive integer more than one, the first antenna elements are further arranged in a second direction perpendicular to the first direction and separated by a third distance, the third distance is p times half of the wavelength, and p is a positive integer more than one;
   the second antenna elements are arranged in the first direction and separated by a second distance, the second distance is n times half of the wavelength, n is a positive integer more than one, m and n are coprime, the second antenna elements are further arranged in the second direction and separated by a fourth distance, the fourth distance is q times half of the wavelength, q is a positive integer more than one, and p and q are coprime;
   the processor circuitry is further configured to generate a synthesized image;
   a pixel value of a pixel included in the synthesized image represents a smaller one of an absolute value of an image signal of a first pixel in first image information and an absolute value of an image signal of a second pixel in second image information;
   the first pixel and the second pixel correspond to the pixel included in the synthesized image;
   image signals in the first image information correspond to reception signals received by the first antenna elements;
   image signals in the second image information correspond to reception signals received by the second antenna elements; and
   the synthesized image does not include phantoms based on grating lobes in the reception signals of at least one of the first antenna elements and the second antenna elements.

2. The electronic apparatus of claim 1, wherein the first antenna elements and the second antenna elements perform transmission and reception in a mono-static method.

3. The electronic apparatus of claim 1, wherein:
a shape of the two-dimensional area is rectangular;
the antenna elements further comprise four third antenna elements, each of the four third antenna element being arranged at a respective one of four corners of the two-dimensional area;
each of respective distances between the four third antenna elements and four first antenna elements closest to the four third antenna elements in the first direction is the first distance;
each of respective distances between the four third antenna elements and four first antenna elements closest to the four third antenna elements in the second direction is the third distance;
each of respective distances between the four third antenna elements and four second antenna elements closest to the four third antenna elements in the first direction is the second distance;
each of respective distances between the four third antenna elements and four second antenna elements closest to the four third antenna elements in the second direction is the fourth distance;
the processor circuitry is further configured to generate a synthesized image;
a pixel value of a pixel included in the synthesized image represents a smaller one of an absolute value of an image signal of a third pixel in third image information and an absolute value of an image signal of a fourth pixel in fourth image information;
the third pixel and the fourth pixel correspond to the pixel included in the synthesized image;
image signals in the third image information correspond to reception signals received by the first antenna elements and reception signals received by the four third antenna elements; and
image signals in the fourth image information correspond to reception signals received by the second antenna elements and reception signals received by the four third antenna elements.

4. The electronic apparatus of claim 1, wherein:
m is equal to p; and
n is equal to q.

5. The electronic apparatus of claim 1, wherein:
m and p are equal to 3; and
n and q are equal to 4.

6. The electronic apparatus of claim 1, wherein the processor circuitry is configured to control the first antenna elements and the second antenna elements, transmit an electromagnetic wave, and control a transmission frequency or bandwidth of the electromagnetic wave.

7. The electronic apparatus of claim 1, wherein:
the first image includes first phantoms based on grating lobes in the reception signals of the first antenna elements;
the second image includes second phantoms based on grating lobes in the reception signals of the second antenna elements; and
pixels of the first phantoms do not correspond to pixels of the second phantoms.

8. An electronic apparatus comprising:
antenna elements; and
processor circuitry configured to calculate a reception signal of virtual antenna elements arranged between pairs of the antenna elements from a signal obtained by transmitting an electromagnetic wave from any of the antenna elements and receiving, by any of the antenna elements, the electromagnetic wave reflected by an object,
wherein:
the virtual antenna elements are arranged in a two-dimensional area, the virtual antenna elements comprising first virtual antenna elements and second virtual antenna elements;
the first virtual antenna elements are arranged in a first direction and separated by a first distance, the first distance is m times half of a wavelength of the electromagnetic wave, m is a positive integer more than one, the first virtual antenna elements are further arranged in a second direction perpendicular to the first direction and separated by a third distance, the third distance is p times half of the wavelength, and p is a positive integer more than one;
the second virtual antenna elements are arranged in the first direction and separated by a second distance, the second distance is n times half of the wavelength, n is a positive integer more than one, m and n are coprime, the second virtual antenna elements are further arranged in the second direction and separated by a fourth distance, the fourth distance is q times half of the wavelength, q is a positive integer more than one, and p and q are coprime;
the processor circuitry is further configured to generate a synthesized image;
a pixel value of a pixel included in the synthesized image represents a smaller one of an absolute value of an image signal of a first pixel in first image information and an absolute value of an image signal of a second pixel in second image information;
the first pixel and the second pixel correspond to the pixel included in the synthesized image;
image signals in the first image information correspond to reception signals received by the first virtual antenna elements;
image signals in the second image information correspond to reception signals received by the second virtual antenna elements; and
the synthesized image does not include phantoms based on grating lobes in the reception signals of at least one of the first antenna elements and the second antenna elements.

9. The electronic apparatus of claim 8, wherein the antenna elements are arranged outside the two-dimensional area.

10. The electronic apparatus of claim 8, wherein the antenna elements perform transmission and reception in a bi-static method or a mono-static method.

11. The electronic apparatus of claim 8, wherein:
a shape of the two-dimensional area is rectangular;
the virtual antenna elements comprise four third virtual antenna elements, each of the four third virtual antenna elements being arranged at a respective one of four corners of the two-dimensional area;
each of respective distances between the four third virtual antenna elements and four first virtual antenna elements closest to the four third virtual antenna elements in the first direction is the first distance;
each of respective distances between the four third virtual antenna elements and four first virtual antenna elements closest to the four third virtual antenna elements in the second direction is the third distance;

each of respective distances between the four third virtual antenna elements and four second virtual antenna elements closest to the four third virtual antenna elements in the first direction is the second distance;
each of respective distances between the four third virtual antenna elements and four second virtual antenna elements closest to the four third virtual antenna elements in the second direction is the fourth distance;
the processor circuitry is further configured to generate a synthesized image;
a pixel value of a pixel included in the synthesized image represents a smaller one of an absolute value of an image signal of a third pixel in third image information and an absolute value of an image signal of a fourth pixel in fourth image information;
the third pixel and the fourth pixel correspond to the pixel included in the synthesized image;
image signals in the third image information correspond to reception signals received by the first virtual antenna elements and reception signals received by the four third virtual antenna elements; and
image signals in the fourth image information correspond to reception signals received by the second virtual antenna elements and reception signals received by the four third virtual antenna elements.

12. The electronic apparatus of claim 8, wherein:
m is equal to p; and
n is equal to q.

13. The electronic apparatus of claim 8, wherein:
m and p are equal to 3; and
n and q are equal to 4.

14. The electronic apparatus of claim 8, wherein the processor circuitry is configured to control the antenna elements, transmit an electromagnetic wave, and control a transmission frequency or bandwidth of the electromagnetic wave.

15. The electronic apparatus of claim 8, wherein:
the first image includes first phantoms based on grating lobes in the reception signals of the first virtual antenna elements;
the second image includes second phantoms based on grating lobes in the reception signals of the second virtual antenna elements; and
pixels of the first phantoms do not correspond to pixels of the second phantoms.

16. An electronic apparatus comprising:
antenna elements; and
processor circuitry configured to obtain a signal obtained by transmitting an electromagnetic wave from any of the antenna elements and receiving, by any of the antenna elements, the electromagnetic wave reflected by an object, and to calculate a reception signal of virtual antenna elements arranged between pairs of the antenna elements from the signal obtained,
wherein:
the antenna elements and the virtual antenna elements comprise:
first antenna elements arranged in a first direction of a two-dimensional area and separated by a first distance, the first distance being m times half of a wavelength of the electromagnetic wave, m being a positive integer more than one, the first antenna elements further being arranged in a second direction of the two-dimensional area and separated by a third distance, the second direction being perpendicular to the first direction, the third distance being p times half of the wavelength, and p being a positive integer more than one; and
second antenna elements arranged in the first direction and separated by a second distance, the second distance being n times half of the wavelength, n being a positive integer more than one, m and n being coprime, the second antenna elements further being arranged in the second direction and separated by a fourth distance, the fourth distance being q times half of the wavelength, q being a positive integer more than one, and p and q being coprime;
the processor circuitry is further configured to generate a synthesized image;
a pixel value of a pixel included in the synthesized image represents a smaller one of an absolute value of an image signal of a first pixel in first image information and an absolute value of an image signal of a second pixel in second image information;
the first pixel and the second pixel correspond to the pixel included in the synthesized image;
image signals in the first image information correspond to reception signals received by the first antenna elements;
image signals in the second image information correspond to reception signals received by the second antenna elements; and
the synthesized image does not include phantoms based on grating lobes in the reception signals of at least one of the first antenna elements and the second antenna elements.

17. The electronic apparatus of claim 16, wherein:
the first antenna elements and the second antenna elements are arranged in a row direction and a column direction of the two-dimensional area; and
a part of the first antenna elements and the second antenna elements is arranged outside the two-dimensional area.

18. The electronic apparatus of claim 17, wherein:
one of the first antenna elements or one of the second antenna elements arranged at a cross point in the row direction and the column direction performs transmission and reception in a bi-static method; and
others of the first antenna elements and others of the second antenna elements perform transmission and reception in a bi-static method or a mono-static method.

19. The electronic apparatus of claim 16, wherein:
a part of the first antenna elements and the second antenna elements is arranged inside the two-dimensional area; and
another part of the first antenna elements and the second antenna elements is arranged outside the two-dimensional area.

20. The electronic apparatus of claim 19, wherein:
the part of the first antenna elements and the second antenna elements performs transmission and reception in a mono-static method, a bi-static method, or a multi-static method; and
the another part of the first antenna elements and the second antenna elements perform transmission and reception in the bi-static method or the multi-static method.

21. The electronic apparatus of claim 16, wherein the first antenna elements and the second antenna elements are arranged inside the two-dimensional area.

22. The electronic apparatus of claim 16, wherein the processor circuitry is configured to calculate a reception signal of virtual antenna elements arranged at mid points of two antenna elements.

23. The electronic apparatus of claim 16, wherein:
a shape of the two-dimensional area is rectangular;
the antenna elements and the virtual antenna elements comprise four third antenna elements, each of the four third antenna elements being arranged at a respective one of four corners of the two-dimensional area;
each of respective distances between the four third antenna elements and four first antenna elements closest to the four third antenna elements in the first direction is the first distance;
each of respective distances between the four third antenna elements and four first antenna elements closest to the four third antenna elements in the second direction is the third distance;
each of respective distances between the four third antenna elements and four second antenna elements closest to the four third antenna elements in the first direction is the second distance;
each of respective distances between the four third antenna elements and four second antenna elements closest to the four third antenna elements in the second direction is the fourth distance;
the processor circuitry is further configured to generate a synthesized image;
a pixel value of a pixel included in the synthesized image represents a smaller one of an absolute value of an image signal of a third pixel in third image information and an absolute value of an image signal of a fourth pixel in fourth image information;
the third pixel and the fourth pixel correspond to the pixel included in the synthesized image;
image signals in the third image information correspond to reception signals received by the first antenna elements and reception signals received by the four third antenna elements; and
image signals in the fourth image information correspond to reception signals received by the second antenna elements and reception signals received by the four third antenna elements.

24. The electronic apparatus of claim 16, wherein:
m is equal to p; and
n is equal to q.

25. The electronic apparatus of claim 16, wherein:
m and p are equal to 3; and
n and q are equal to 4.

26. The electronic apparatus of claim 16, wherein the processor circuitry is configured to control the first antenna elements and the second antenna elements, transmit an electromagnetic wave, and control a transmission frequency or bandwidth of the electromagnetic wave.

27. The electronic apparatus of claim 16, wherein:
the first image includes first phantoms based on grating lobes in the reception signals of the first antenna elements;
the second image includes second phantoms based on grating lobes in the reception signals of the second antenna elements; and
pixels of the first phantoms do not correspond to pixels of the second phantoms.

28. An imaging method comprising:
transmitting an electromagnetic wave from any of antenna elements arranged in a two-dimensional area, the antenna elements comprising first antenna elements and second antenna elements; and
controlling the first antenna elements and the second antenna elements and receiving an electromagnetic wave,
wherein:
the first antenna elements are arranged in a first direction and separated by a first distance, the first distance is m times half of a wavelength of the electromagnetic wave, m is a positive integer more than one, the first antenna elements are further arranged in a second direction perpendicular to the first direction and separated by a third distance, the third distance is p times half of the wavelength, and p is a positive integer more than one;
the second antenna elements are arranged in the first direction and separated by a second distance, the second distance is n times half of the wavelength, n is a positive integer more than one, m and n are coprime, the second antenna elements are further arranged in the second direction and separated by a fourth distance, the fourth distance is q times half of the wavelength, q is a positive integer more than one, and p and q are coprime;
the method further comprises generating a synthesized image;
a pixel value of a pixel included in the synthesized image represents a smaller one of an absolute value of an image signal of a first pixel in first image information and an absolute value of an image signal of a second pixel in second image information;
the first pixel and the second pixel correspond to the pixel included in the synthesized image;
image signals in the first image information correspond to reception signals received by the first antenna elements;
image signals in the second image information correspond to reception signals received by the second antenna elements; and
the synthesized image does not include phantoms based on grating lobes in the reception signals of at least one of the first antenna elements and the second antenna elements.

* * * * *